United States Patent
Kusukame et al.

(10) Patent No.: US 11,312,383 B2
(45) Date of Patent: Apr. 26, 2022

(54) ROAD SURFACE CONDITION PREDICTION SYSTEM, DRIVING ASSISTANCE SYSTEM, ROAD SURFACE CONDITION PREDICTION METHOD, AND DATA DISTRIBUTION METHOD

(71) Applicant: PANASONIC INTELLECTUAL PROPERTY MANAGEMENT CO., LTD., Osaka (JP)

(72) Inventors: Koichi Kusukame, Osaka (JP); Tatsuo Itoh, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 344 days.

(21) Appl. No.: 16/331,435

(22) PCT Filed: Sep. 8, 2017

(86) PCT No.: PCT/JP2017/032454
§ 371 (c)(1),
(2) Date: Mar. 7, 2019

(87) PCT Pub. No.: WO2018/051913
PCT Pub. Date: Mar. 22, 2018

(65) Prior Publication Data
US 2019/0217864 A1    Jul. 18, 2019

(30) Foreign Application Priority Data

Sep. 13, 2016  (JP) .............................. JP2016-178972
Sep. 13, 2016  (JP) .............................. JP2016-178973

(51) Int. Cl.
*B60W 40/06*   (2012.01)
*G08G 1/01*    (2006.01)
(Continued)

(52) U.S. Cl.
CPC .......... *B60W 40/06* (2013.01); *B60W 40/064* (2013.01); *B60W 50/0097* (2013.01);
(Continued)

(58) Field of Classification Search
CPC . B60W 40/06; B60W 50/0097; G05D 1/0088
See application file for complete search history.

(56) References Cited

U.S. PATENT DOCUMENTS 5,497,100 A    3/1996  Reiser et al.
5,699,056 A    12/1997 Yoshida
(Continued)

FOREIGN PATENT DOCUMENTS

EP    0412791 A2    2/1991
JP    62-155138 A   7/1987
(Continued)

OTHER PUBLICATIONS

Partial Suoplementary European Search Report issued in corresponding European Patent Application No. 17850815.6, dated Aug. 13, 2019.
(Continued)

*Primary Examiner* — Peter D Nolan
*Assistant Examiner* — Tarek Elarabi
(74) *Attorney, Agent, or Firm* — McDermott Will & Emery LLP

(57) ABSTRACT

A road surface condition prediction system includes a collector which collects pieces of moisture information on moisture on a road surface obtained by detecting the moisture on the road surface of a road on which moving bodies travel, and pieces of position information each indicating a position on the road surface at which the moisture is detected, one or more of the pieces of moisture information and one or more of the pieces of position information being collected from each of the moving bodies; and a predictor
(Continued)

which predicts a moisture condition of a target road surface at a time after a time at which moisture on the target road surface is detected, based on moisture information obtained by detecting the moisture on the target road surface, the target road surface being a road surface at a position indicated by at least one of the pieces of position information.

18 Claims, 25 Drawing Sheets

(51) Int. Cl.
*G08G 1/0967* (2006.01)
*G01W 1/02* (2006.01)
*B60W 40/064* (2012.01)
*B60W 50/00* (2006.01)
*G01W 1/14* (2006.01)
*G01C 21/36* (2006.01)
*G05D 1/00* (2006.01)

(52) U.S. Cl.
CPC ........... *G01C 21/3691* (2013.01); *G01W 1/02* (2013.01); *G01W 1/14* (2013.01); *G05D 1/0088* (2013.01); *G08G 1/0112* (2013.01); *G08G 1/0129* (2013.01); *G08G 1/0141* (2013.01); *G08G 1/09675* (2013.01); *G08G 1/096725* (2013.01); *G08G 1/096775* (2013.01); *B60W 2050/0075* (2013.01); *B60W 2552/00* (2020.02); *B60W 2555/20* (2020.02); *B60W 2556/10* (2020.02); *B60W 2556/50* (2020.02); *G05D 2201/0213* (2013.01)

(56) References Cited

U.S. PATENT DOCUMENTS

| 6,161,071 | A | 12/2000 | Shuman et al. |
| 6,853,894 | B1 | 2/2005 | Kolls |
| 2009/0078870 | A1 | 3/2009 | Haruna |
| 2014/0081507 | A1* | 3/2014 | Urmson ................ B60W 40/06 701/28 |
| 2014/0081573 | A1 | 3/2014 | Urmson et al. |
| 2014/0278052 | A1 | 9/2014 | Slavin et al. |
| 2015/0178572 | A1* | 6/2015 | Omer ................... G08G 1/0141 382/108 |
| 2017/0241778 | A1 | 8/2017 | Hanatsuka et al. |

FOREIGN PATENT DOCUMENTS

| JP | H08-210993 A | 8/1996 |
| JP | 08-263783 A | 10/1996 |
| JP | 11-053696 A | 2/1999 |
| JP | 11-321597 A | 11/1999 |
| JP | H11-326539 A | 11/1999 |
| JP | 2000-322698 A | 11/2000 |
| JP | 2002-311157 A | 10/2002 |
| JP | 2004-191276 A | 7/2004 |
| JP | 2004-341795 A | 12/2004 |
| JP | 2006-017501 A | 1/2006 |
| JP | 2008-003829 A | 1/2008 |
| JP | 2008-185563 A | 8/2008 |
| JP | 2009-237739 A | 10/2009 |
| JP | 2010-151543 A | 7/2010 |
| JP | 2013-108830 A | 6/2013 |
| JP | 2014-178843 A | 9/2014 |
| JP | 2015-535204 A | 12/2015 |
| JP | 2016-080451 A | 5/2016 |
| JP | 2016-513805 A | 5/2016 |
| WO | 2007083741 A1 | 7/2007 |
| WO | 2013/173911 A1 | 11/2013 |

OTHER PUBLICATIONS

International Search Report and Written Opinion dated Dec. 5, 2017 in International Patent Application No. PCT/JP2017/032454; with partial English translation.

Japanese Office Action issued in correspodiong Japanese Patent Application No. 2018-539681, dated Jul. 21, 2020.

* cited by examiner

FIG. 8

| DATE AND TIME | POSITION | ROAD SURFACE CONDITION | MOVING VELOCITY [km/h] | WEATHER INFORMATION ||||||||| 
| | | | | WEATHER | AIR TEMP [°C] | RAINFALL [mm] | SNOWFALL [cm] | WIND DIRECTION | WIND SPEED [m/s] | SUNSHINE DURATION [h] | HUMIDITY [%] | ATMOSPHERIC PRESSURE [hPa] |
|---|---|---|---|---|---|---|---|---|---|---|---|---|
| 2015/2/1 5:00:01.00 | NORTH LATITUDE:37° 54′ 08″ EAST LONGITUDE:139° 1′ 25″ | ICE | 45 | SNOW | 0.0 | 0.0 | 1 | WEST | 5.4 | 0.0 | 80 | 1021.9 |
| 2015/2/1 5:00:01.50 | NORTH LATITUDE:37° 54′ 08″ EAST LONGITUDE:139° 1′ 25″ | SNOW | 45 | SNOW | 0.0 | 0.0 | 1 | WEST | 5.4 | 0.0 | 80 | 1021.9 |
| 2015/2/1 5:00:33.00 | NORTH LATITUDE:37° 54′ 08″ EAST LONGITUDE:139° 1′ 25″ | SNOW | 30 | SNOW | 0.0 | 0.0 | 1 | WEST | 5.4 | 0.0 | 80 | 1021.9 |
| 2015/2/1 5:02:01.00 | NORTH LATITUDE:37° 54′ 08″ EAST LONGITUDE:139° 1′ 25″ | SNOW | 40 | SNOW | 0.0 | 0.0 | 1 | WEST | 5.4 | 0.0 | 80 | 1021.9 |
| 2015/2/1 5:02:11.00 | NORTH LATITUDE:37° 54′ 08″ EAST LONGITUDE:139° 1′ 25″ | WATER | 40 | SNOW | 0.0 | 0.0 | 1 | WEST | 5.4 | 0.0 | 80 | 1021.9 |
| 2015/2/1 5:02:12.00 | NORTH LATITUDE:37° 54′ 08″ EAST LONGITUDE:139° 1′ 25″ | SNOW | 40 | SNOW | 0.0 | 0.0 | 1 | WEST | 5.4 | 0.0 | 80 | 1021.9 |
| 2015/2/1 5:02:31.00 | NORTH LATITUDE:37° 54′ 08″ EAST LONGITUDE:139° 1′ 25″ | SNOW | 45 | SNOW | 0.0 | 0.0 | 1 | WEST | 5.4 | 0.0 | 80 | 1021.9 |
| 2015/2/1 5:03:01.00 | NORTH LATITUDE:37° 54′ 08″ EAST LONGITUDE:139° 1′ 25″ | SNOW | 30 | SNOW | 0.0 | 0.0 | 1 | WEST | 5.4 | 0.0 | 80 | 1021.9 |
| 2015/2/1 5:03:05.00 | NORTH LATITUDE:37° 54′ 08″ EAST LONGITUDE:139° 1′ 25″ | ICE | 30 | SNOW | 0.0 | 0.0 | 1 | WEST | 5.4 | 0.0 | 80 | 1021.9 |
| 2015/2/1 5:03:05.10 | NORTH LATITUDE:37° 54′ 08″ EAST LONGITUDE:139° 1′ 25″ | SNOW | 30 | SNOW | 0.0 | 0.0 | 1 | WEST | 5.4 | 0.0 | 80 | 1021.9 |
| 2015/2/1 5:03:10.00 | NORTH LATITUDE:37° 54′ 08″ EAST LONGITUDE:139° 1′ 25″ | SNOW | 45 | SNOW | 0.0 | 0.0 | 1 | WEST | 5.4 | 0.0 | 80 | 1021.9 |
| 2015/2/1 5:03:21.00 | NORTH LATITUDE:37° 54′ 08″ EAST LONGITUDE:139° 1′ 25″ | SNOW | 40 | SNOW | 0.0 | 0.0 | 1 | WEST | 5.4 | 0.0 | 80 | 1021.9 |

FIG. 11

|  |  | DRYNESS | WET | ACCUMULATED SNOW | FREEZING |
|---|---|---|---|---|---|
| INITIAL ROAD SURFACE PROPORTION |  | 0.3 | 0 | 0.25 | 0.45 |
| WEATHER CORRECTION COEFFICIENT | kumori | 0.8 | 0.8 | 0.8 | 0.8 |
| SNOWFALL [cm] | 0 | 0 | 0 | 0 | 0 |
| RAINFALL [mm] | 0 | 0 | 0 | 0 | 0 |
| TEMPERATURE [°C] | 5 |  |  |  |  |
| MOISTURE CONDITION AMOUNT ACCORDING TO SNOWING, TEMPERATURE, AND WEATHER CORRECTION COEFFICIENT |  | 0 | 0 | 0 | 0 |
| MOISTURE CONDITION AMOUNT ACCORDING TO RAINING, TEMPERATURE, AND WEATHER CORRECTION COEFFICIENT |  | 0 | 0 | 0 | 0 |
| MOISTURE CONDITION AMOUNT ACCORDING TO INITIAL ROAD SURFACE PROPORTION, TEMPERATURE, AND WEATHER CORRECTION COEFFICIENT |  | 0.3 | 0.168 | 0.15 | 0.27 |
| INTEGRATION OF CONDITION AMOUNTS |  | 0.3 | 0.168 | 0.15 | 0.27 |
| PROPORTION OF DRYNESS, WET, ACCUMULATED SNOW, AND FREEZING |  | 0.34 | 0.19 | 0.17 | 0.30 |

(a)

|  |  | DRYNESS | WET | ACCUMULATED SNOW | FREEZING |
|---|---|---|---|---|---|
| INITIAL ROAD SURFACE PROPORTION |  | 0.3 | 0.25 | 0.45 | 0 |
| WEATHER CORRECTION COEFFICIENT | yuki | 1 | 1 | 1 | 1 |
| SNOWFALL [cm] | 1 | 0 | 0 | 1 | 0 |
| RAINFALL [mm] | 0 | 0 | 0 | 0 | 0 |
| TEMPERATURE [°C] | -5 |  |  |  |  |
| MOISTURE CONDITION AMOUNT ACCORDING TO SNOWING, TEMPERATURE, AND WEATHER CORRECTION COEFFICIENT |  | 0 | 0 | 1 | 0 |
| MOISTURE CONDITION AMOUNT ACCORDING TO RAINING, TEMPERATURE, AND WEATHER CORRECTION COEFFICIENT |  | 0 | 0 | 0 | 0 |
| MOISTURE CONDITION AMOUNT ACCORDING TO INITIAL ROAD SURFACE PROPORTION, TEMPERATURE, AND WEATHER CORRECTION COEFFICIENT |  | 0.3 | 0.125 | 0.45 | 0.125 |
| INTEGRATION OF CONDITION AMOUNTS |  | 0.3 | 0.125 | 1.45 | 0.125 |
| PROPORTION OF DRYNESS, WET, ACCUMULATED SNOW, AND FREEZING |  | 0.15 | 0.06 | 0.73 | 0.06 |

| DATE AND TIME | POSITION | ROAD SURFACE CONDITION | DRYNESS: WATER: SNOW: ICE | WEATHER INFORMATION ||||||||| 
| | | | | WEATHER | AIR TEMP [°C] | RAINFALL [mm] | SNOWFALL [cm] | WIND DIRECTION | WIND SPEED [m/s] | SUNSHINE DURATION [h] | HUMIDITY [%] | ATMOSPHERIC PRESSURE [hPa] |
| 2015/3/27 16:00 | NORTH LATITUDE:43° 3′ 51″ EAST LONGITUDE:141° 20′ 49″ | SNOW | 0:0.1:0.9:0 | CLOUD | 5.1 | 0.0 | 1.0 | SOUTH-SOUTHEAST | 1.7 | 0.0 | 58 | 1009.5 |
| 2015/3/27 16:00 | NORTH LATITUDE:34° 41′ 11″ EAST LONGITUDE:135° 31′ 12″ | DRYNESS | 1:0:0:0 | SUN | 11.4 | 0.0 | 0.0 | WEST-SOUTHWEST | 0.1 | 0.2 | 45 | 1027.0 |
| 2015/3/27 16:00 | NORTH LATITUDE:37° 54′ 08″ EAST LONGITUDE:139° 1′ 25″ | WATER | 0.7:0.3:0:0 | RAIN | 8.6 | 2.0 | 0.0 | WEST-SOUTHWEST | 3.3 | 0.1 | 51 | 1025.4 |
| 2015/3/27 16:00 | NORTH LATITUDE:36° 2′ 42″ EAST LONGITUDE:138° 6′ 30″ | ICE | 0.2:0.3:0:0.5 | SUN | 7.0 | 0.0 | 1.5 | WEST-NORTHWEST | 2.2 | 0.1 | 42 | 1025.0 |

FIG. 21

| DATE AND TIME | POSITION | ROAD SURFACE CONDITION | DRYNESS: WATER: SNOW: ICE | WEATHER INFORMATION ||||||||
|---|---|---|---|---|---|---|---|---|---|---|---|
| | | | | WEATHER | AIR TEMP [°C] | RAINFALL [mm] | SNOWFALL [cm] | WIND DIRECTION | WIND SPEED [m/s] | SUNSHINE DURATION [h] | HUMIDITY [%] | ATMOSPHERIC PRESSURE [hPa] |
| 2015/2/1 5:00 | NORTH LATITUDE:37° 54′ 08″ EAST LONGITUDE:139° 1′ 25″ | ICE | 0:0:0.2:0.8 | SNOW | 0.0 | 0.0 | 1 | WEST | 5.4 | | 80 | 1021.9 |
| 2015/2/1 6:00 | NORTH LATITUDE:37° 54′ 08″ EAST LONGITUDE:139° 1′ 25″ | ICE | 0:0:0.2:0.8 | CLOUD | 0.0 | 0.0 | - | WEST | 4.9 | | 81 | 1022.4 |
| 2015/2/1 7:00 | NORTH LATITUDE:37° 54′ 08″ EAST LONGITUDE:139° 1′ 25″ | SNOW | 0:0.3:0.5:0.2 | RAIN/SNOW | 0.6 | 0.5 | 1 | WEST-NORTHWEST | 4.2 | 0.0 | 68 | 1022.6 |
| 2015/2/1 8:00 | NORTH LATITUDE:37° 54′ 08″ EAST LONGITUDE:139° 1′ 25″ | SNOW | 0:0.4:0.5:0.1 | CLOUD | 1.4 | 0.0 | - | NORTHWEST | 6.2 | 0.0 | 59 | 1022.8 |
| 2015/2/1 9:00 | NORTH LATITUDE:37° 54′ 08″ EAST LONGITUDE:139° 1′ 25″ | SNOW | 0:0.4:0.5:0.1 | CLOUD | -0.5 | 0.0 | - | WEST-NORTHWEST | 5.3 | 0.0 | 82 | 1023.4 |
| 2015/2/1 10:00 | NORTH LATITUDE:37° 54′ 08″ EAST LONGITUDE:139° 1′ 25″ | WATER | 0:0.6:0.4:0 | CLOUD | 1.7 | 0.0 | - | NORTHWEST | 4.7 | 0.0 | 57 | 1023.2 |
| 2015/2/1 11:00 | NORTH LATITUDE:37° 54′ 08″ EAST LONGITUDE:139° 1′ 25″ | WATER | 0:0.6:0.4:0 | CLOUD | 1.7 | 0.0 | - | WEST | 3.9 | 0.1 | 61 | 1022.9 |
| 2015/2/1 12:00 | NORTH LATITUDE:37° 54′ 08″ EAST LONGITUDE:139° 1′ 25″ | WATER | 0:0.7:0.3:0 | CLOUD | 1.2 | 0.0 | - | WEST-NORTHWEST | 3.2 | 0.0 | 79 | 1022.8 |
| 2015/2/1 13:00 | NORTH LATITUDE:37° 54′ 08″ EAST LONGITUDE:139° 1′ 25″ | SNOW | 0:0.4:0.6:0 | SNOW | 0.7 | 0.5 | 1 | WEST-NORTHWEST | 5.7 | 0.2 | 75 | 1022.5 |
| 2015/2/1 14:00 | NORTH LATITUDE:37° 54′ 08″ EAST LONGITUDE:139° 1′ 25″ | SNOW | 0:0.4:0.6:0 | CLOUD | 0.9 | 0.0 | - | WEST | 7.1 | 0.0 | 73 | 1022.6 |
| 2015/2/1 15:00 | NORTH LATITUDE:37° 54′ 08″ EAST LONGITUDE:139° 1′ 25″ | SNOW | 0:0.4:0.6:0 | SUN | 1.1 | 0.0 | - | WEST-NORTHWEST | 5.1 | 0.1 | 75 | 1023.0 |
| 2015/2/1 16:00 | NORTH LATITUDE:37° 54′ 08″ EAST LONGITUDE:139° 1′ 25″ | SNOW | 0:0.4:0.6:0 | SUN | 0.8 | 0.0 | - | NORTH-NORTHWEST | 4.9 | 0.0 | 85 | 1023.4 |

ROAD SURFACE CONDITION PREDICTION SYSTEM, DRIVING ASSISTANCE SYSTEM, ROAD SURFACE CONDITION PREDICTION METHOD, AND DATA DISTRIBUTION METHOD

CROSS-REFERENCE OF RELATED APPLICATIONS

This application is the U.S. National Phase under 35 U.S.C. § 371 of International Patent Application No. PCT/JP2017/032454, filed on Sep. 8, 2017, which in turn claims the benefit of Japanese Application No. 2016-178972, filed on Sep. 13, 2016, and Japanese Application No. 2016-178973, filed on Sep. 13, 2016, the entire disclosures of which Applications are incorporated by reference herein.

TECHNICAL FIELD

This disclosure relates to a road surface condition prediction system which predicts the moisture conditions of road surfaces, a driving assistance system, a road surface condition prediction method, and a data distribution method.

BACKGROUND ART

For example, PTL 1 discloses a technique of predicting a road surface condition in a place within a predetermined range using a road surface prediction determination value of the place within the predetermined range, the value being computed from information of a behavior of a vehicle obtained by an in-vehicle sensor. PTL 2 discloses a technique of detecting moisture distribution as a road surface condition in the driving route of a vehicle, and predicting freezing of the road surface based on the temperature of outdoor air. PTL 3 discloses a technique of predicting whether a roadway is wet or not, and determining the drive of an autonomous vehicle based on the result of prediction.

CITATION LIST

Patent Literature

PTL 1: Japanese Unexamined Patent Application Publication No. 2016-80451
PTL 2: Japanese Unexamined Patent Application Publication No. 2010-151543
PTL 3: Japanese Unexamined Patent Application Publication (Translation of PCT Application) No. 2015-535204

SUMMARY OF THE INVENTION

Technical Problem

Unfortunately, these conventional techniques above do not provide prediction of the moisture conditions of road surfaces with sufficient precision.

Accordingly, an object of this disclosure is to provide a road surface condition prediction system which can predict the moisture condition of a road surface with precision, a driving assistance system, a road surface condition prediction method, and a data distribution method.

Solution to Problem

To achieve the object above, the road surface condition prediction system according to one aspect of this disclosure includes a collector which collects pieces of moisture information on moisture on a road surface obtained by detecting the moisture on the road surface of a road on which multiple moving bodies are traveling, and pieces of position information each indicating a position on the road surface at which the moisture is detected, one or more of the pieces of moisture information and one or more of the pieces of position information being collected from each of the multiple moving bodies; and a predictor which predicts a moisture condition of a target road surface at a time after a time at which moisture on the target road surface is detected, based on moisture information obtained by detecting the moisture on the target road surface among the pieces of moisture information collected by the collector, the target road surface being a road surface at a position indicated by at least one of the pieces of position information collected by the collector.

Moreover, the driving assistance system according to one aspect of this disclosure includes the road surface condition prediction system; a reception terminal which is mounted on a vehicle and receives distribution information; and a controller which assists automated driving of the vehicle based on the distribution information received by the reception terminal.

Moreover, the road surface condition prediction method according to one aspect of this disclosure collects pieces of moisture information on moisture on a road surface obtained by detecting the moisture on the road surface of a road where multiple moving bodies are traveling, and pieces of position information each indicating a position on the road surface at which the moisture is detected, one or more of the pieces of moisture information and one or more of the pieces of position information being collected from each of the multiple moving bodies; and predicts a moisture condition of a target road surface at a time after a time at which moisture on the target road surface is detected, based on moisture information obtained by detecting the moisture on the target road surface among the pieces of moisture information collected, the target road surface being a road surface at a position indicated by at least one of the pieces of position information collected.

Moreover, the data distribution method according to one aspect of this disclosure distributes distribution information including a result of prediction predicted by the road surface condition prediction method.

These general or specific aspects may be implemented with systems, methods, integrated circuits, computer programs, or computer-readable recording media such as a CD-ROM, or may be implemented with any combination of systems, methods, integrated circuits, computer programs, and recording media.

Advantageous Effect of Invention

This disclosure can provide a road surface condition prediction system which can precisely predict the moisture condition of a road surface, a driving assistance system, a road surface condition prediction method, and a data distribution method.

BRIEF DESCRIPTION OF DRAWINGS

FIG. 8 is a table illustrating a structure of accumulated data accumulated in a storage of the road surface condition prediction system according to Embodiment 1.

FIG. 11 is a diagram illustrating one example of the result of prediction of the moisture condition according to Embodiment 1.

FIG. 20 is a table illustrating one example of accumulated data in four positions at a specific time according to Embodiment 6.

FIG. 21 is a table illustrating one example of accumulated data obtained every one hour in a specific position according to Embodiment 6.

Figure 1:
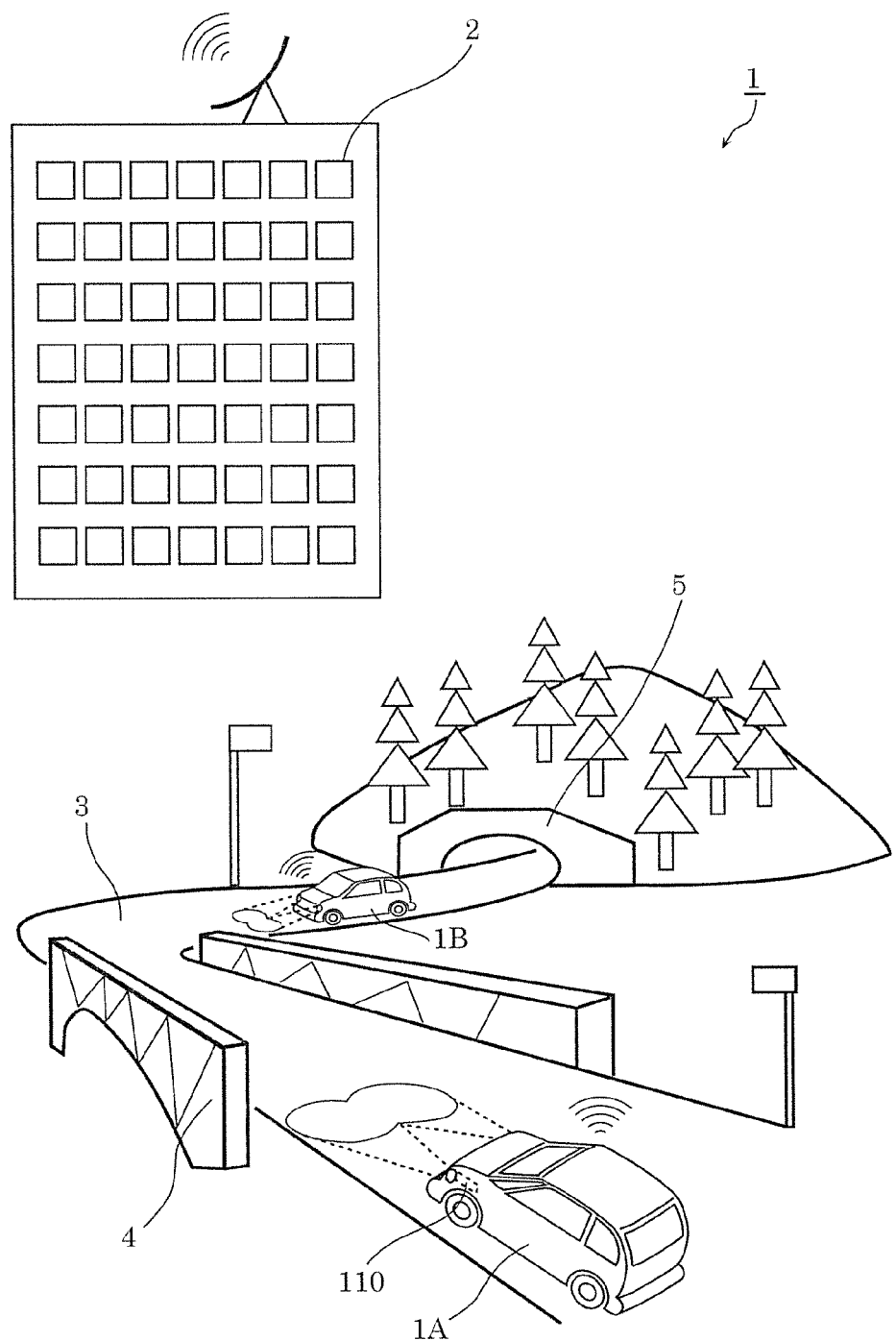
FIG. 1 is a schematic view illustrating an outline of a road surface condition prediction system according to Embodiment 1.

DESCRIPTION OF EXEMPLARY EMBODIMENTS (Knowledge Underlying this Disclosure)

The road surface conditions which cause troubles to driving of vehicles include conditions where the coefficient of friction between wheels and a road surface reduces, such as floods, puddles, freezing, and accumulated snow on the road surface. For example, considering situations until a road surface freezes, freezing of a road surface occurs through the following process. First, raining or snowing causes puddles or accumulated snow on the road surface. Residual water or water generated after melting of snow freezes as the road surface temperature reduces.

In addition, the spread of freezing, accumulated snow, and puddles all affect the speed of state transition. The "spread" specifically indicates the area of a region of freezing, accumulated snow, or puddles, or a length thereof in the detection direction. Here, the "state transition" indicates transition in state from freezing to puddles, or vice versa, that from accumulated snow to puddles, or that from accumulated snow to freezing, for example. Accordingly, the prediction of the road surface conditions requires knowing the road surface conditions in the past and preferably their spreads.

A technique of detecting the moisture includes a method using dichroism spectroscopy in a near-infrared region. Water has light absorption peaks at wavelengths near 740 nm, 980 nm, 1450 nm, and 1940 nm. In dichroism spectroscopy, first, the road surface is irradiated with light having wavelengths near the absorption peaks (hereinafter, referred to as absorption light) and light having a wavelength other than the light having wavelengths near the absorption peaks (hereinafter, referred to as reference light). The intensity ratio (=absorption/reference) of the intensity of the scatter-reflected light of the absorption light to that of the reference light of the scatter-reflected light by the road surface is then compared to a predetermined threshold.

For example, in the case where the moisture is present on the road surface, the absorption light is absorbed due to moisture to decay, reducing the intensity of the scatter-reflected light of the absorption light. In the case where there is no moisture on the road surface, the decay of the absorption light due to the moisture is reduced, increasing the intensity of the scatter-reflected light of the absorption light. The scatter-reflected light of the reference light does not depend on the presence/absence of moisture. Thus, the presence/absence of moisture can be detected. Specifically, the intensity ratio of a dry road surface is measured, and the measured value is used as a predetermined threshold. When the target road surface for measurement has an intensity ratio lower than the predetermined threshold, it is determined that the road surface is wet.

Furthermore, the temperature of the road surface is measured with a radiation thermometer, for example. Thereby, in the case where there is water and the road surface temperature is less than 0° C., it is determined that the road surface is frozen. If there is water and the road surface temperature is 0° C. or higher, it is determined that water is present on the road surface.

Snow is a strong scatterer. For this reason, the scatter-reflected light of the reference light by the road surface having accumulated snow exhibits scattered reflection stronger than the scatter-reflected light by a road surface without accumulated snow. Accordingly, the reflectance of the reference light by a dry road surface is measured in advance, and in the case where the reflectance of the reference light by the target road surface for measurement is higher than the reflectance of the reference light by the dry road surface, it is determined that there is snow.

Moreover, as a result of research uniquely conducted by the present inventors, the present inventors have found that the water amount can also be measured by appropriate design of wavelength, light intensity, and polarization to be used. For example, the road surface is irradiated with light having a wavelength of 1400 nm to 1600 nm to measure the scatter-reflected light of the light used for irradiation, thereby enabling the measurement of the thickness of water in the range of several ten micrometers to several hundred micrometers. Similarly, the road surface is irradiated with light having a wavelength of 900 nm to 1100 nm to measure the scatter-reflected light of the light used for irradiation, thereby enabling the measurement of the thickness of water in the range of several hundred micrometers to several centimeters.

A smaller thickness of water results in larger light quantity of the scatter-reflected light of the absorption light. In the case where water has an excessively large or small thickness, the relation between the light quantity of the scatter-reflected light and the thickness of water is reduced, and thus the S/N is also reduced. For this reason, the present inventors have found that use of an appropriate wavelength according to the range of the thickness of water to be measured is required for precise measurement of the thickness of water.

The measurement of the moisture amount on the road surface enables precise prediction of the time until the road surface dries thereafter. This also enables the prediction that the road surface will completely dry due to an increase in air temperature during the daytime or that the road surface will freeze because the night falls while the moisture remains on the road surface and then the air temperature reduces.

Furthermore, in the case where the scatter-reflected light of the absorption light and the scatter-reflected light of the reference light are received by an area sensor and thermography is used in combination, water, ice, or snow can be discriminated and the size thereof can also be determined. The moisture on the road surface is discriminated and grasped as water, ice, or snow, and the size thereof is determined. Thereby, the precision in prediction of the moisture condition of the road surface is improved.

For example, in the case where water is detected on the road surface, the water gradually decreases when the air temperature rises thereafter without raining or snowing. At this time, the time until water disappears is increased when a wider region of water is detected, and the time until water disappears is reduced when a narrow region of water is detected. Similarly, the time until water disappears is reduced when the detected water has a smaller thickness, and the time until water disappears is increased when the water has a larger thickness. In contrast, the possibility of freezing increases when the air temperature reduces and the road surface temperature becomes less than 0° C.

A change in road surface temperature is related with heat radiation from the road surface and the amount of heat accumulated on the road surface due to the weather in the past, for example, other than the air temperature. For this reason, what is important is the weather information at a spot where moisture information is obtained. The weather information can be obtained from the information released by meteorological bureaus or meteorological equipment disposed on the roads. On the road surface having accumulated snow, the state of snow is maintained when the road surface temperature is less than 0° C., and melting of snow starts when the road surface temperature exceeds 0° C. When the road surface temperature falls below 0° C. in this state due to a weather change, the road surface freezes.

On the road surface having ice, that is, the frozen road surface, a road surface temperature of 0° C. is a boundary whether the ice on the road surface is maintained or changes into water. Furthermore, from the subsequent change in weather, it can be predicted whether the road surface will freeze again or will get dry. At this time, irrespective of snow or ice, to know at least one of the size and the thickness of snow or ice will facilitate the prediction of the time until the snow or ice melts or disappears. Thus, the precision in prediction of the road surface condition is improved.

The moisture information may also include the temperature information of moisture. From the moisture temperature at a point of time of measurement, not only the moisture condition (snow, ice, or water) at that time is determined, but also the precision in prediction of the time until snow melts or the road surface freezes thereafter can be enhanced. For example, the time until the moisture freezes is increased when the moisture temperature at a point of time of measurement is 0° C. or more and is higher. The time until snow melts is increased when the moisture temperature at a point of time of measurement is less than 0° C. and is lower.

The moisture information may also include light absorption information, which indicates the absorption of sunlight by moisture. For example, the temperature is significantly increased by solar radiation and the time until snow melts is reduced in the moisture containing mud or the like and having high absorption of sunlight. The absorption of sunlight is calculated from the intensity of the scatter-reflected light of the reference light, for example. A larger intensity of the scatter-reflected light indicates that the moisture has lower absorption of sunlight.

To summarize, knowing the moisture information (indicating the state of the moisture on the road surface, the size, the thickness, the temperature thereof, and the absorption of sunlight by the road surface) and the weather information can improve the precision in prediction of the road surface condition.

The weather information may include not only air temperature and humidity but also solar radiation or wind strength, for example. A stronger solar radiation accelerates the speed of drying, unfreezing, or melting snow, and a stronger wind accelerates the drying speed. Use of a larger quantity of information which affects the transition of the moisture condition can improve the precision in prediction of the road surface condition.

To realize such knowledge, the road surface condition prediction system according to one aspect of this disclosure includes a collector which collects pieces of moisture information on moisture on a road surface obtained by detecting the moisture on the road surface of a road on which multiple moving bodies are traveling, and pieces of position information each indicating a position on the road surface at which the moisture is detected, one or more of the pieces of moisture information and one or more of the pieces of position information being collected from each of the multiple moving bodies; and a predictor which predicts a moisture condition of a target road surface at a time after a time at which moisture on the target road surface is detected, based on moisture information obtained by detecting the moisture on the target road surface among the pieces of moisture information collected by the collector, the target road surface being a road surface at a position indicated by at least one of the pieces of position information collected by the collector.

Such a configuration enables precise prediction of the moisture condition on the road surface. Moreover, the moisture information is collected from the multiple moving bodies. For this reason, the moisture information in a wide range can be collected in the case where the multiple moving bodies are traveling on different roads, for example. Moreover, in the case where the multiple moving bodies travel on the same road at different time zones, the amount of information on change in the moisture condition on the road surface can be increased. Thereby, the precision in prediction of the moisture condition can be enhanced.

Moreover, for example, the moisture information may include thickness information indicating the thickness of the moisture detected.

Such a configuration including the thickness information can estimate the moisture amount of the road surface, and can precisely predict the time needed for disappearance of the moisture, unfreezing, or freezing. Accordingly, the precision in prediction of the moisture condition can be enhanced.

Moreover, for example, the moisture information may include temperature information indicating the temperature of the moisture detected.

Such a configuration including the temperature information can obtain the temperature of the moisture on the road surface, and can precisely predict the time needed for disappearance of the moisture, unfreezing, or freezing. Accordingly, the precision in prediction of the moisture condition can be enhanced.

Moreover, for example, the moisture information may include light absorption information indicating the absorption of sunlight by the moisture detected.

Such a configuration including the light absorption information can estimate the likeliness of evaporation of the moisture on the road surface by sunlight, and can precisely predict the time needed for disappearance of the moisture, unfreezing, or freezing. Accordingly, the precision in prediction of the moisture condition can be enhanced.

Moreover, for example, the road surface condition prediction system according to one aspect of this disclosure may further include a first obtainer which obtains environmental information indicating at least one of air temperature, humidity, wind speed, light quantity of sunlight, and atmospheric pressure at the position indicated by the at least one of the pieces of position information collected by the collector.

Such a configuration can estimate the influences of the ambient environment over the moisture, and can precisely predict the time needed for disappearance of the moisture, unfreezing, or freezing. Accordingly, the precision in prediction of the moisture condition can be enhanced.

Moreover, for example, the road surface condition prediction system according to one aspect of this disclosure may further include a second obtainer which obtains weather information indicating weather at the position indicated by the at least one of the pieces of position information collected by the collector.

Such a configuration can estimate the influences of the weather over the moisture, and can precisely predict the disappearance of the moisture, unfreezing, or freezing. Accordingly, the precision in prediction of the moisture condition can be enhanced.

Moreover, for example, the road surface condition prediction system according to one aspect of this disclosure may further include a discriminator which generates state information indicating a state of the moisture detected by discriminating whether the moisture detected is water, ice, snow, or a mixed state thereof, and an accumulator which accumulates the state information in association with the at least one of the pieces of position information and the weather information.

Such a configuration can enhance the precision in prediction of the state of the moisture based on the moisture condition on the road surface and the weather information. Moreover, by accumulating the state information in association with the position information and the weather information, the moisture condition can be precisely predicted based on the data in the past.

Moreover, for example, the discriminator may further discriminate a degree of spread of the water, ice, snow, or mixed state thereof on the road surface.

Such a configuration can estimate the moisture amount of the road surface, and can precisely predict the time needed for disappearance of the moisture, unfreezing, or freezing. Accordingly, the precision in prediction of the moisture condition can be enhanced.

Moreover, for example, the discriminator may be mounted on each of the multiple moving bodies.

In such a configuration, the moisture condition can be predicted in the moving body because the moisture condition can be discriminated in each of the multiple moving bodies.

Moreover, for example, the second obtainer may obtain pieces of the weather information multiple times after a time at which the moisture on the road surface at the position indicated by the at least one of the pieces of position information is detected, and the accumulator may accumulate the pieces of the weather information obtained by the second obtainer.

Such a configuration can enhance the precision in prediction of the moisture condition based on the weather information in the past and the weather prediction in the future.

Moreover, for example, the accumulator may further update the state information based on the weather information.

Such a configuration enables prediction based on highly fresh information because the state information is updated based on the weather information. Accordingly, the precision in prediction of the moisture condition can be enhanced. Although the interval for update is several seconds to several days, for example, any other interval can be used.

Moreover, for example, the accumulator may collectively accumulate the state information for each travel route of the multiple moving bodies.

Such a configuration can collect a large amount of results of detection of the moisture in a wide region, and the prediction data of the moisture condition in a wider region with high precision can be created and used.

Moreover, for example, the road surface condition prediction system according to one aspect of this disclosure may further include a third obtainer which obtains modification information on modification of a road, and the accumulator may update the state information based on the modification information.

In such a configuration, a change in moisture condition due to the operation such as removal of snow, drainage of water, or unfreezing performed by the road manager can be quickly reflected in the prediction of the moisture condition.

Moreover, for example, the road surface condition prediction system according to one aspect of this disclosure may further include an announcer which announces the result of prediction by the predictor.

In such a configuration, the road surface condition can be announced in advance to a person who drives the vehicle or a person who walks on the road.

Moreover, for example, the road surface condition prediction system according to one aspect of this disclosure may further include a determiner which determines, based on the result of prediction by the predictor, whether the road is passable; and a searcher which searches for a bypass in the case where the determiner determines that the road is not passable. The announcer may further announce the bypass searched by the searcher.

Such a configuration can avoid places which may be obstructions to the travel.

Moreover, for example, the road surface condition prediction system according to one aspect of this disclosure may further include a distributor which distributes distribution information including the result of prediction by the predictor.

Such a configuration can distribute the result of prediction to other vehicles, road managers, traffic managers, traffic information business operators, transportation business operators, and mail business operators.

For example, the driving assistance system according to one aspect of this disclosure includes the road surface condition prediction system; a reception terminal which is mounted on a vehicle and receives the distribution information; and a controller which assists automated driving of the vehicle based on the distribution information received by the reception terminal.

Such a configuration can provide safe driving because dangerous places can be avoided, the vehicle speed can be controlled, or the suspension can be controlled based on the distributed result of prediction.

Moreover, for example, the driving assistance system according to one aspect of this disclosure may include the road surface condition prediction system, and a controller which assists automated driving of a vehicle based on a result of prediction by the predictor.

Such a configuration can provide safe driving even in spots which the vehicle itself cannot sense, because dangerous places can be avoided, the vehicle speed can be controlled, or the suspension can be controlled based on the result of prediction.

Moreover, the road surface condition prediction method according to one aspect of this disclosure collects pieces of moisture information on moisture on a road surface obtained by detecting the moisture on the road surface of a road where multiple moving bodies are traveling, and pieces of position information each indicating a position on the road surface at which the moisture is detected, one or more of the pieces of moisture information and one or more of the pieces of position information being collected from each of the multiple moving bodies; and predicts a moisture condition of a target road surface at a time after a time at which moisture on the target road surface is detected, based on moisture information obtained by detecting the moisture on the target road surface among the pieces of moisture information collected, the target road surface being a road surface at a position indicated by at least one of the pieces of position information collected.

Such a configuration can precisely predict the moisture condition on the road surface. Moreover, the pieces of moisture information are collected from the multiple moving bodies. For this reason, the moisture information in a wide range can be collected in the case where the multiple moving bodies are traveling on different roads, for example. Moreover, in the case where the multiple moving bodies travel on the same road at different time zones, the amount of information on change in the moisture condition on the road surface can be increased. Thereby, the precision in prediction of the moisture condition can be enhanced.

Moreover, the data distribution method according to one aspect of this disclosure distributes distribution information including a result of prediction predicted by the road surface condition prediction method.

Such a configuration can distribute the result of prediction to other vehicles, road managers, traffic managers, traffic information business operators, transportation business operators, and mail business operators.

Although the details will be described later, the road surface condition prediction system according to this disclosure may estimate the moisture condition of the road surface at the current time based on the moisture information obtained in the past and the history of the weather information until the current time in some cases. In this specification, the estimation of the moisture condition of the road surface at the current time is also referred using the same term "prediction" as in the prediction of the moisture condition in the future. The estimation of the road surface condition not only at the current time but also at a time after the time at which the moisture information is obtained and before the current time is also referred using the term "prediction".

Embodiments according to this disclosure will now be described with reference to the drawings.

The embodiments described below each illustrate one specific example of this disclosure. Numeric values, shapes, components, arrangements of components, connection forms thereof, steps, order of the steps, and the like described in the following embodiments are illustrative, and should not be construed as limitative to this disclosure. Among the components of the embodiments below, the components not described in an independent claim representing the most superordinate concept of the present disclosure are described as arbitrary components. In all the embodiments, contents thereof can also be combined.

The drawings are schematic views, and are not always strictly drawn. In the drawings, identical reference numerals are given to substantially identical components, and the duplication of descriptions thereof are omitted or simplified in some cases.

Embodiment 1

FIG. 1 is a schematic view illustrating of an outline of road surface condition prediction system 1 according to Embodiment 1.

FIG. 1 schematically illustrates a state where two moving bodies 1A and 1B are traveling on road 3. Road 3 extends from bridge 4 through exit 5 of a tunnel to the inside of the tunnel. Moving body 1A is going to cross over bridge 4, and moving body 1B has come out of exit 5 of the tunnel.

Moving bodies 1A and 1B are specifically vehicles such as four-wheeled vehicles or two-wheeled vehicles, and are traveling on road 3. At least one of moving bodies 1A and 1B may be a flying body called a drone.

Moving bodies 1A and 1B obtain moisture information on moisture on a road surface by detecting the moisture on the road surface of road 3 while traveling on road 3. Moving bodies 1A and 1B transmit or receive the information through wireless communication with information center 2.

Information center 2 receives the information transmitted from moving bodies 1A and 1B to process the received information. Information center 2 is specifically an information processing apparatus such as a computer.

Road surface condition prediction system 1 according to the present embodiment includes multiple moving bodies including moving bodies 1A and 1B, and information center 2. An example of a specific configuration of components included in road surface condition prediction system 1 will now be described in detail.

Figure 2:
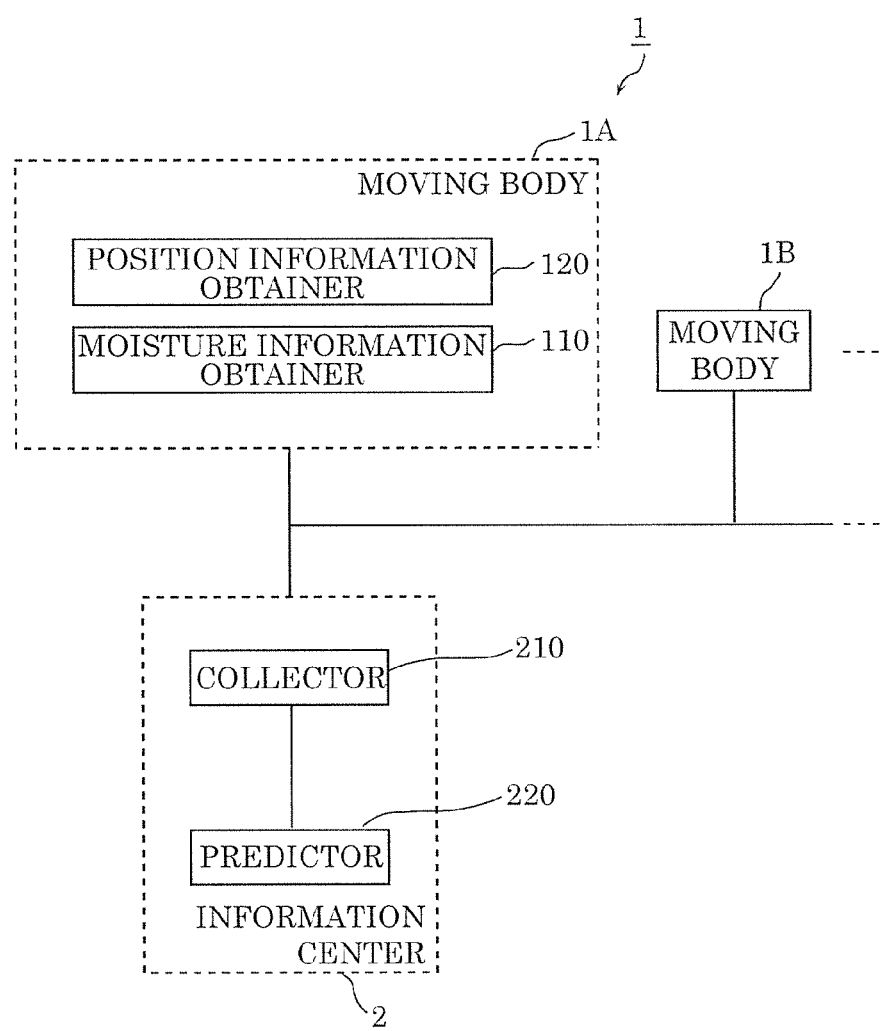
FIG. 2 is a block diagram illustrating a minimum configuration of the road surface condition prediction system according to Embodiment 1.

First, with reference to FIG. 2, a minimum configuration of road surface condition prediction system 1 will be described. FIG. 2 is a block diagram illustrating a minimum configuration of road surface condition prediction system 1 according to the present embodiment.

As illustrated in FIG. 2, moving body 1A includes moisture information obtainer 110 and position information obtainer 120. Moving body 1A and moving body 1B have the same configuration. For this reason, the configuration of moving body 1A will now be described.

Moisture information obtainer 110 obtains the moisture information on moisture on a road surface by detecting the moisture on the road surface of road 3 on which moving body 1A is traveling. For example, moisture information obtainer 110 is implemented with a sensor module which detects the moisture, and a signal processing circuit which processes output signals from the sensor module, for example. Moisture information obtainer 110 periodically and repeatedly obtains the moisture information and the position information as moving body 1A is moving. This obtaining operation is performed one time per second or less, for example. This frequency may be varied according to the speed of moving body 1A.

The moisture information specifically includes at least one of thickness information, temperature information, and light absorption information. The thickness information indicates the thickness of the moisture on the road surface. The temperature information indicates the temperature of the moisture on the road surface. The light absorption information indicates the absorption of sunlight by the moisture on the road surface.

The moisture information includes state information indicating a state of the moisture on the road surface. The state information indicates dryness, water, snow, ice, or a mixed state of two or more states thereof. Specifically, the state information is represented by the proportions of dryness, water, snow, and ice. The proportions thereof are determined such that the total of the proportion of dryness, the proportion of water, the proportion of snow, and the proportion of ice amounts to 1, for example. The state information corresponds to the result of determination of the moisture condition obtained by determining which state the detected moisture has, i.e., water, ice, snow, or a mixed state thereof.

Position information obtainer 120 obtains position information indicating the position on the road surface from which the moisture is detected. Position information obtainer 120 is implemented with a global positioning system (GPS) receiver, for example. The position information is represented by a latitude and a longitude, for example. The position information may further include an altitude.

Although not illustrated, moving body 1A includes a communicator which wirelessly communicates with information center 2. The obtained moisture information and position information are transmitted to information center 2 by the communicator.

Moving body 1A may include a memory for storing the moisture information and position information. Pieces of moisture information and pieces of position information obtained at different times are stored in the memory in association with the times, for example.

As illustrated in FIG. 2, information center 2 includes collector 210 and predictor 220.

Collector 210 collects moisture information and position information from moving bodies 1A and 1B. Collector 210 is a communication interface, for example.

Specifically, collector 210 collects the moisture information and the position information whenever necessary through wireless communication with moving bodies 1A and 1B. Alternatively, in the case where the moisture information and the position information are stored in the memory included in moving body 1A, collector 210 may read the pieces of moisture information and the pieces of position information from the memory to collectively collect those pieces.

Among the pieces of moisture information collected by collector 210, based on the moisture information obtained by detecting moisture on a target road surface, which is a road surface at a position indicated by at least one of the pieces of position information collected by collector 210, predictor 220 predicts the moisture condition of the target road surface at a time after the time at which the moisture on the target road surface is detected. The target road surface is a road surface at a position set as a target position for prediction by a user or a road manager, for example. In the case where the pieces of position information collected by collector 210 do not include any position information indicating the set position, position information indicating a position closest to the specified position may be used.

In the following description, the time at which the moisture on the target road surface is detected may also be referred to as "detection time" in some cases. A time as a target for prediction after the detection time may also be referred to as "target time" in some cases.

The target time is a current time at which predictor 220 performs prediction, for example. Alternatively, the target time may be a time after the current time, or may be a time before the current time. In other words, in the present embodiment, even when the target time is a past time from the current time, predictor 220 "predicts" the moisture condition of the target road surface at the past time.

Predictor 220 is implemented with a non-volatile memory which stores programs, a volatile memory which is a transient memory region for executing the programs, an input/output port, and a processor which executes the programs.

Figure 3:
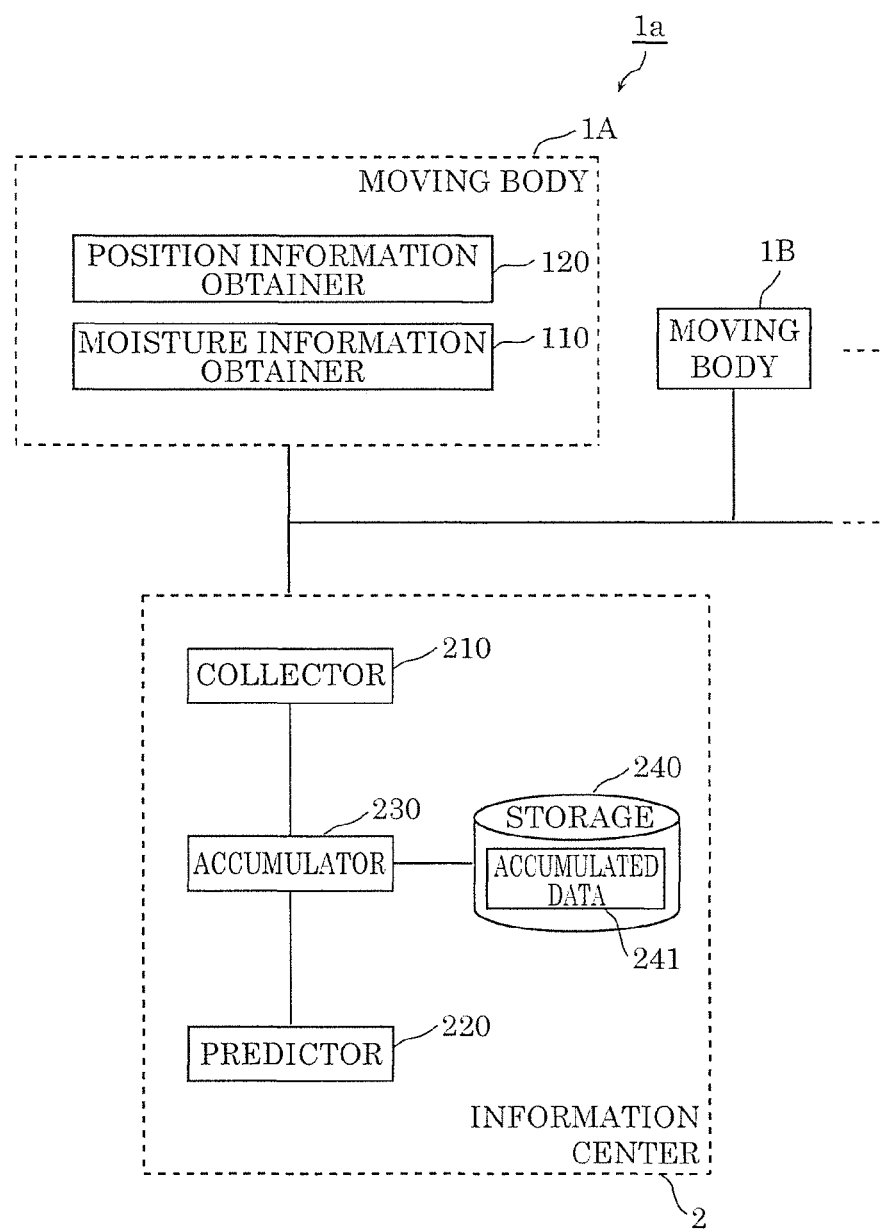
FIG. 3 is a block diagram illustrating another configuration of the road surface condition prediction system according to Embodiment 1.

Another configuration of road surface condition prediction system 1 will now be described with reference to FIG. 3. FIG. 3 is a block diagram illustrating another configuration of the road surface condition prediction system according to the present embodiment.

Unlike road surface condition prediction system 1 illustrated in FIG. 2, information center 2 in road surface condition prediction system 1a illustrated in FIG. 3 further includes accumulator 230 and storage 240.

Accumulator 230 accumulates the state information indicating the moisture condition in association with the position information. Specifically, accumulator 230 stores the state information, as accumulated data 241 in storage 240, in association with the position information. One example of the data structure of accumulated data 241 will be described later with reference to FIG. 8.

Storage 240 is a magnetic recording device such as a hard disk drive (HDD), an optical disc such as a Blu-ray (registered trademark) (BD) disc, or a flash memory, for example. Storage 240 stores accumulated data 241. Accumulated data 241 is updated by accumulator 230 whenever necessary.

According to road surface condition prediction system 1a illustrated in FIG. 3, for example, predictor 220 reads accumulated data 241 from storage 240 at a timing specified by the user, and predicts the moisture condition of the road surface at the target time based on the state information of the target road surface included in read accumulated data 241, or the like. Thus, accumulated data 241 stored in storage 240 enables the prediction at any timing.

Figure 4:
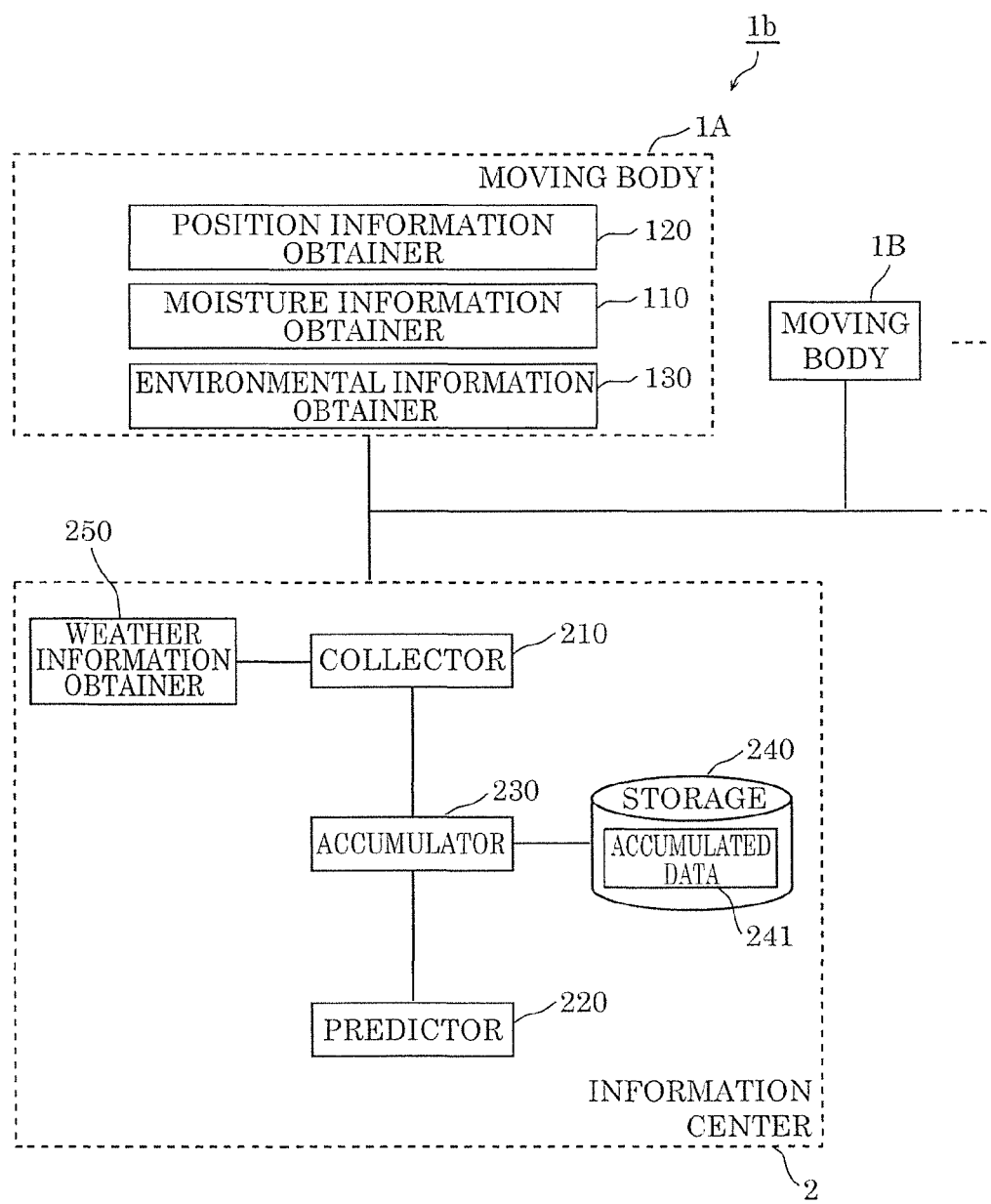
FIG. 4 is a block diagram illustrating another configuration of the road surface condition prediction system according to Embodiment 1.

A further another configuration of road surface condition prediction system 1 will now be described with reference to FIG. 4. FIG. 4 is a block diagram illustrating another configuration of the road surface condition prediction system according to the present embodiment.

Unlike road surface condition prediction system 1a illustrated in FIG. 3, in road surface condition prediction system 1b illustrated in FIG. 4, moving body 1A further includes environmental information obtainer 130, and information center 2 further includes weather information obtainer 250.

Environmental information obtainer 130 is one example of a first obtainer which obtains environmental information. Specifically, environmental information obtainer 130 obtains the environmental information by measuring an environment around moving body 1A at a position and a time at which the moisture on the road surface is detected while moving body 1A is traveling on road 3.

The environmental information is information indicating at least one of the air temperature, the humidity, the wind speed, the light quantity of sunlight, and the atmospheric pressure at a position indicated by at least one of the pieces of position information collected by collector 210. For example, environmental information obtainer 130 is implemented with a means for measuring physical quantities of a target for measurement installed in moving body 1A, such as a temperature sensor, a humidity sensor, a wind speed sensor, an illuminance sensor, an atmospheric pressure sensor, a rainfall sensor, and a wind speed sensor. In the case where the wind speed is measured, the precision of measurement of the wind speed can be increased by providing both of a wind speed sensor and a vehicle speed sensor.

In road surface condition prediction system 1b illustrated in FIG. 4, the moisture information is transmitted to information center 2 in association with the position information and the environmental information.

Weather information obtainer 250 is one example of a second obtainer which obtains the weather information. Weather information obtainer 250 obtains the weather information at a detection time, for example. Weather information obtainer 250 also obtains multiple pieces of weather information at multiple times after the detection time. Specifically, weather information obtainer 250 may periodically obtain the weather information during a period from the detection time to a target time (for example, after N hours from the current time). For example, weather information obtainer 250 may obtain the weather information every one hour. Weather information obtainer 250 obtains the weather information from a public agency, such as a weather bureau or a civil agency, for example.

The weather information indicates the weather of a position indicated by at least one of the pieces of position information collected by collector 210. Specifically, the weather information indicates the weather, such as sun, cloud, rain, snow, or fog. The weather information may include not only the weather but also at least one of the air temperature, the rainfall, the snowfall, the wind direction, the sunshine duration, the humidity, and the atmospheric pressure. The weather information may also include the dew point temperature, the vapor pressure, the cloud cover, and the global solar radiation, for example. The weather information after the current time is prediction information of the weather based on weather forecasting.

Road surface condition prediction system 1b illustrated in FIG. 4 including weather information obtainer 250 can precisely predict changes in moisture condition caused by the weather. Furthermore, road surface condition prediction system 1b including environmental information obtainer 130 can obtain more detailed environmental information for each position of roads than that from the weather information. For this reason, road surface condition prediction system 1b can highly precisely predict changes in the moisture condition on road surfaces of the positions.

The weather information and the environmental information may be used as input data for machine learning. Thereby, based on the weather information, the environmental information of each position of roads can be estimated, further improving the precision in prediction of a change in the moisture condition of the road surface.

In the case where moving body 1A does not include environmental information obtainer 130, the weather information obtained by weather information obtainer 250 may be used as environmental information.

Figure 5:
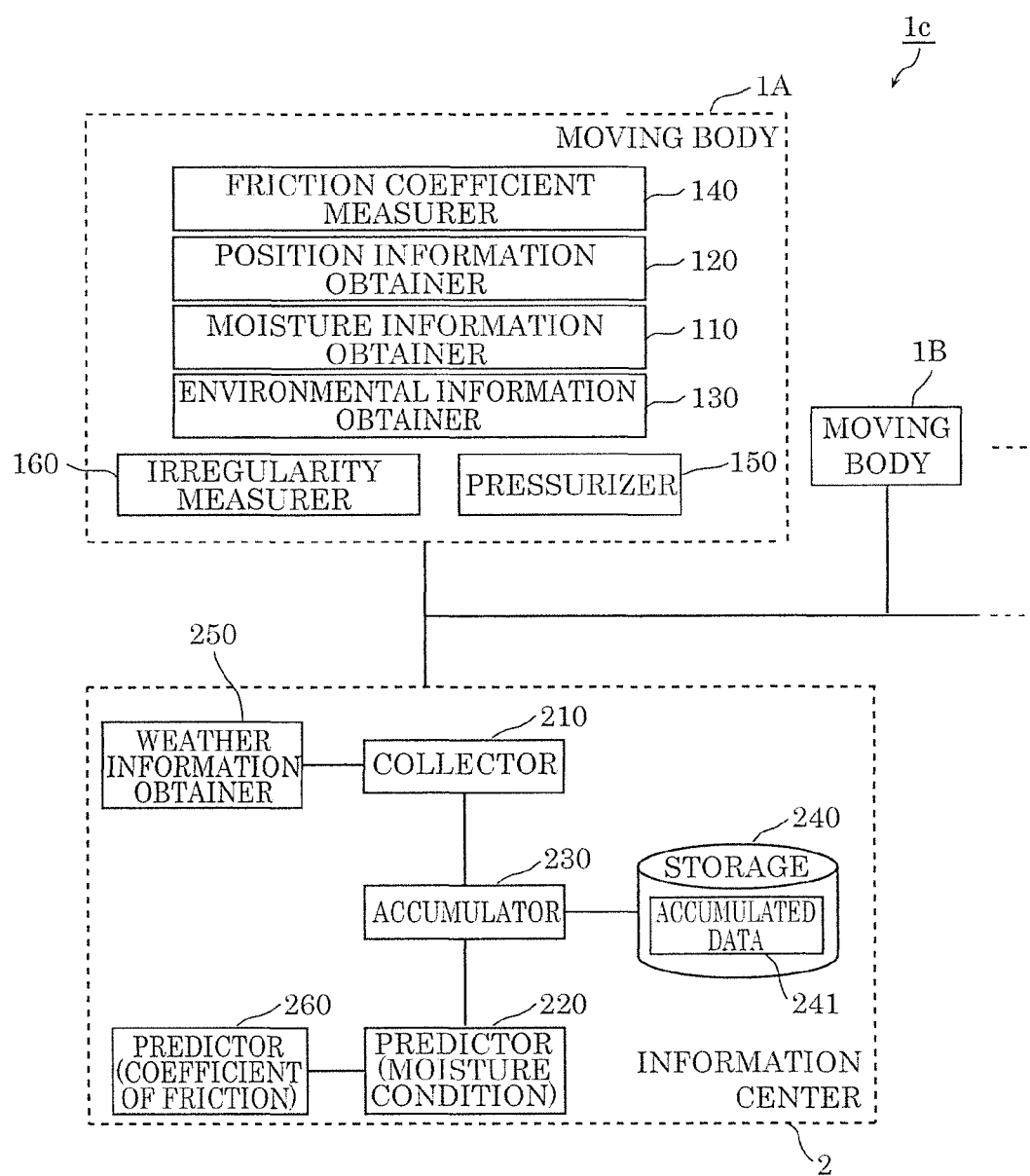
FIG. 5 is a block diagram illustrating another configuration of the road surface condition prediction system according to Embodiment 1.

Further another configuration of road surface condition prediction system 1 will now be described with reference to FIG. 5. FIG. 5 is a block diagram illustrating another configuration of the road surface condition prediction system according to the present embodiment.

Unlike road surface condition prediction system 1b illustrated in FIG. 4, in road surface condition prediction system 1c illustrated in FIG. 5, moving body 1A further includes friction coefficient measurer 140, pressurizer 150, and irregularity measurer 160. Furthermore, unlike road surface condition prediction system 1b, in road surface condition prediction system 1c, information center 2 further includes predictor 260 which predicts the coefficient of friction.

Friction coefficient measurer 140 measures the coefficient of friction of the road surface on which moving body 1A is traveling. For example, in the case where moving body 1A is a vehicle, friction coefficient measurer 140 is a sensor which measures a tension applied to a string with a weight at its distal end while the string is in contact with the road. For example, the sensor can measure the coefficient of friction of the road surface by measuring a force applied to the string when the string is pulled by friction with the road surface.

In the case where moving body 1A is a vehicle, friction coefficient measurer 140 may also calculate the coefficient of friction based on the slip ratio of the tires of the vehicle. The relation between the moisture information at each position on the road surface and the coefficient of friction can be known by obtaining the coefficient of friction in association with the moisture information. Thereby, in information center 2, predictor 260 can predict the coefficient of friction of the road surface at a time after the time at which the coefficient of friction is measured. Knowing the coefficient of friction of the road enables safer traveling of the vehicle.

Pressurizer 150 pressurizes the road surface on which moving body 1A is traveling. Irregularity measurer 160 measures a change in surface irregularities of the road surface before and after pressurizing by pressurizer 150. Thereby, the hardness of the moisture on the road surface can be measured. For example, an approach to measure surface irregularities before and after pressurizing is effective to discriminate the state of accumulated snow from the state of freezing where the surface is covered with snow.

In the case where moving body 1A is a vehicle, pressurizer 150 is a tire of the vehicle. At this time, irregularity measurer 160 measures the surface irregularities of the road surface anterior and posterior to the tire.

Pressurizer 150 may be an ultrasonically transmitting source which outputs ultrasonic waves, or a release mechanism which releases compressed air, for example. Thereby, the road surface can be instantaneously pressurized. In such a configuration, the surface irregularities before and after pressurizing can be measured by a single irregularity measurer 160.

Irregularity measurer 160 may be implemented with a time of flight (TOF) camera or a self-emission type infrared camera, and a signal processing circuit which processes signals output from the TOF camera or the infrared camera, for example. Irregularity measurer 160 may calculate the surface irregularities based on the light quantity of scattered light, which is generated as a result of scattering of irradiated light on the road surface.

Alternatively, irregularity measurer 160 may be implemented with a distance meter such as a millimeter-wave radar, an ultrasonic radar, or a laser light radar, and a processing circuit which processes the results of measurement. Irregularity measurer 160 may measure the surface irregularities from a temporal change in the distance from the road surface of the road on which moving body 1A is traveling to moving body 1A.

Even when pressurizer 150 is a tire, for example, irregularity measurer 160 may be disposed at a position where both of the road surface anterior to the tire and the road surface posterior to the tire enter the field of vision. Thereby, the hardness of the road surface can be measured with a single pressurizer 150 (specifically, a single tire) and a single irregularity measurer 160 (specifically, a single TOF camera, for example).

Alternatively, irregularity measurer 160 may have a target region for measurement, which is a wide region posterior to the tire. Specifically, irregularity measurer 160 measures both of the surface irregularities of the road surface passed by the tire, i.e., the road surface pressurized by the tire and those of the road surface which is not in contact with the tire. Irregularity measurer 160 then may determine the difference between the surface irregularities of the road surface pressurized and those of the road surface not pressurized. Also in this case, the hardness of the road surface can be measured.

Although not illustrated, other than the method of measuring the change in shapes of the irregularities before and after pressurizing, a method of vibrating the road surface to measure the amplitude may be used. This method effectively improves the precision in discrimination between snow and ice. A usable vibrator which applies vibration to the road surface may be an ultrasonically transmitting source or a sound source such as a speaker, for example, similarly to pressurizer 150.

As described above, moving body 1A obtains the surface information indicating the coefficient of friction of the road surface and the surface irregularities. The surface information may indicate only one of the coefficient of friction and the surface irregularities. Moving body 1A does not need to include friction coefficient measurer 140, and does not need to include pressurizer 150 and irregularity measurer 160.

In road surface condition prediction system 1c illustrated in FIG. 5, the moisture information, the position information, the environmental information, and the surface information are transmitted to information center 2.

Based on the surface information, predictor 260 predicts the coefficient of friction of the road surface at a time after the time at which the coefficient of friction or surface irregularities is measured. Specifically, predictor 260 predicts the coefficient of friction of the target road surface at the target time. For example, based on the moisture condition of the road surface predicted by predictor 220, predictor 260 predicts a change in coefficient of friction at a time for measurement, which is the coefficient of friction indicated by the surface information.

For example, in the case where it is predicted that the proportion of freezing of the road surface will increase during a period from the time for measurement to the target time, predictor 260 calculates the coefficient of friction at the target time smaller than that at the time for measurement. Alternatively, in the case where it is predicted that the proportion of dryness of the road surface will increase during a period from the time for measurement to the target time, predictor 260 calculates the coefficient of friction at the target time larger than that at the time for measurement. Alternatively, for example, in the case where it is predicted that the surface irregularities will increase during a period from the time for measurement to the target time, predictor 260 calculates the coefficient of friction at the target time larger than that at the time for measurement.

Thus, road surface condition prediction system 1c illustrated in FIG. 5 can implement safe traveling of the vehicle because the coefficient of friction of the road surface at the target time is predicted.

Figure 6:
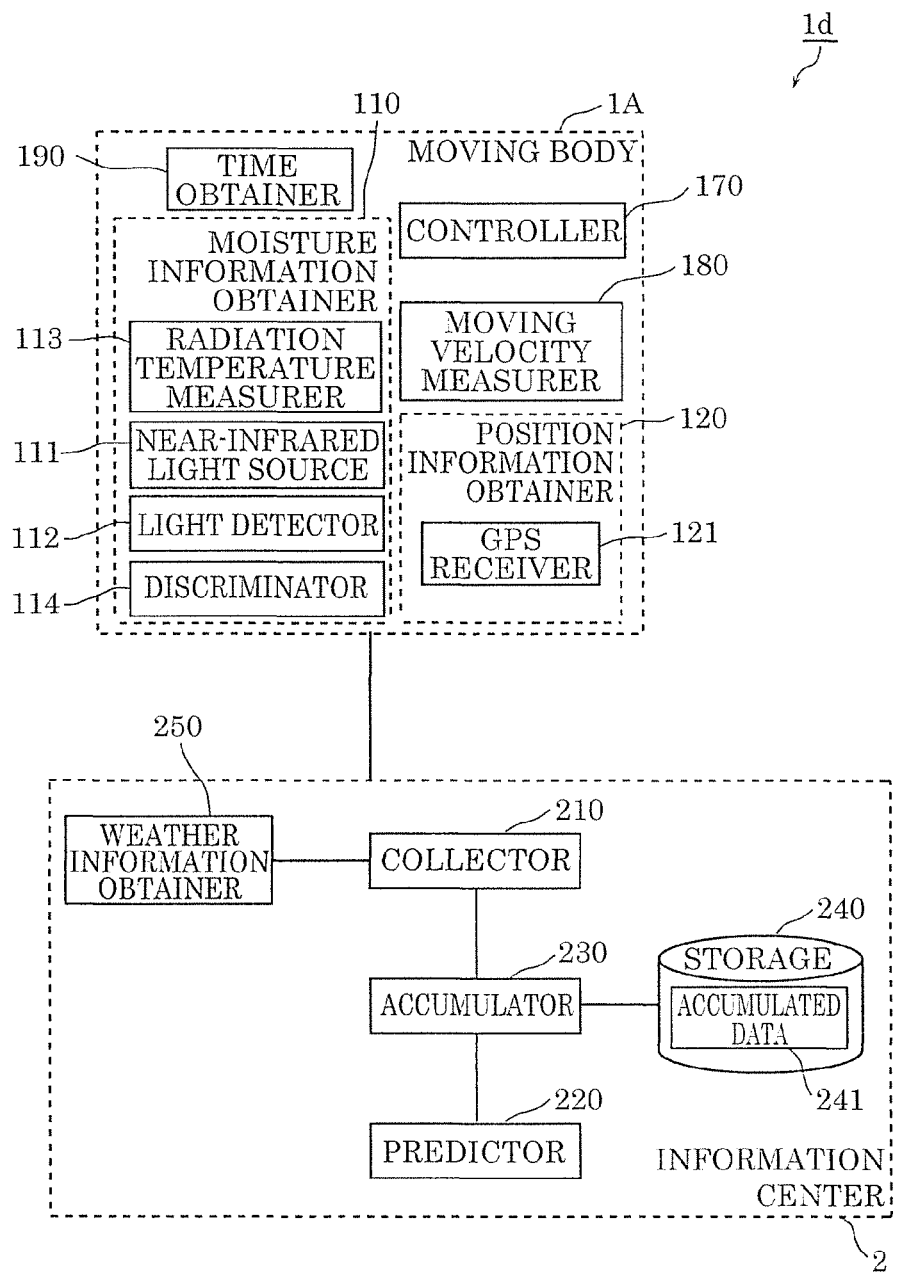
FIG. 6 is a block diagram illustrating another configuration of the road surface condition prediction system according to Embodiment 1.

Further another configuration of road surface condition prediction system 1 will now be described with reference to FIG. 6. FIG. 6 is a block diagram illustrating another configuration of the road surface condition prediction system according to the present embodiment.

Unlike road surface condition prediction system 1b illustrated in FIG. 4, in road surface condition prediction system 1d illustrated in FIG. 6, moving body 1A includes controller 170, moving velocity measurer 180, and time obtainer 190 without environmental information obtainer 130. FIG. 6 illustrates a detailed configuration of moisture information obtainer 110 and position information obtainer 120.

Moving body 1A illustrated in FIG. 6 may include environmental information obtainer 130. Similarly, moving body 1A illustrated in FIG. 6 may include friction coefficient measurer 140, pressurizer 150, and irregularity measurer 160 illustrated in FIG. 5.

As illustrated in FIG. 6, moisture information obtainer 110 includes near-infrared light source 111, light detector 112, radiation temperature measurer 113, and discriminator 114. Based on the intensity of scatter-reflected light of the infrared light by the road surface, moisture information obtainer 110 detects the moisture on the road surface as a spot type. The region irradiated with infrared light is the target area for detection of the moisture, i.e., the area for measurement.

Near-infrared light source 111 emits near-infrared light. Specifically, near-infrared light source 111 emits near-infrared light toward the road surface of the road on which moving body 1A is traveling. Near-infrared light source 111 is a solid light-emitting element such as a light emitting diode (LED) or a laser element.

Light detector 112 receives scatter-reflected light of the near-infrared light by the road surface, the near-infrared light being emitted from near-infrared light source 111. The moisture is detected according to the intensity of the scatter-reflected light. Light detector 112 is implemented with a photoelectric converting element such as a photodiode or a phototransistor.

The near-infrared light is emitted in a forward direction of moving body 1A, for example, in a lane in which moving body 1A is traveling, but can be emitted in any direction. The irradiation direction of the near-infrared light may be a backward direction of moving body 1A. Alternatively, the irradiation direction of the near-infrared light may be a direction left or right to moving body 1A. In this case, the near-infrared light is emitted to the other lane such as an opposite lane, a median strip, a side strip, a motorcycle lane, or a sidewalk, rather than the lane in which moving body 1A is traveling. Thereby, the moisture condition of the road surface of another traveling zone such as the opposite lane can be detected, rather than the lane in which the moving body is traveling.

For example, moving body 1A may include pairs of near-infrared light source 111 and light detector 112. Thereby, the moisture conditions of the road surfaces in multiple lanes can be detected.

Radiation temperature measurer 113 measures the temperature of the road surface. Radiation temperature measurer 113 is a non-contact type temperature sensor, for example, and measures the temperature of the road surface by measuring the amount of infrared radiation emitted from the road surface.

Discriminator 114 discriminates whether the moisture indicated by the moisture information corresponds to water, ice, snow, or a mixed state thereof. Specifically, discriminator 114 generates the state information indicating the moisture condition by discriminating that the state of the moisture on the road surface is dryness, water, ice, snow, or a mixed state of two or more thereof.

Discriminator 114 also discriminates the state of spread of water, ice, snow, or a mixed state thereof on the road surface. The state of spread is represented as an area, for example.

Discriminator 114 is implemented with a non-volatile memory which stores programs, a volatile memory which is a transient memory region for executing programs, an input/output port, and a processor which executes the programs. Discriminator 114 may be implemented with a hardware resource similar to controller 170.

Because moving body 1A moves in the present embodiment, moisture information obtainer 110 of a spot type can obtain the moisture information of multiple positions. Moisture information obtainer 110 of a spot type has a compact configuration at lower cost than a two-dimensional type moisture information obtainer.

Although the details will be described in Embodiment 6, the two-dimensional moisture information obtainer detects the moisture for each light receiving region using a light receiving element having multiple light receiving regions arranged into a matrix. Thereby, the two-dimensional distribution of the moisture amount can be obtained as the moisture information. Moving body 1A may include a two-dimensional moisture information obtainer. Thereby, the spread of the moisture can be measured with higher precision.

In the case where moving body 1A includes moisture information obtainer 110 of a spot type, pieces of moisture information whose areas for measurement partially overlap each other may be obtained. Thereby, the distribution information of the moisture amount with a higher resolution than the size of the area for measurement can be obtained. Accordingly, also in the case where moisture information obtainer 110 of a spot type is included, the spread of the moisture can be measured with higher precision. Moreover, the distribution information of the moisture amount with much higher resolution can be obtained by performing subpixel shift super-resolution processing using the pieces of moisture information whose areas for measurement partially overlap each other.

The size of the area for measurement has a width of 5 cm or more, for example. Thereby, the moisture condition of the road surface can be measured with high precision.

In the case where moving body 1A is a vehicle, the size of the area for measurement may have a width of 10 cm or more. Thereby, the moisture condition of the road surface within the region where the tire passes can be obtained. The distribution information of the moisture amount may be obtained with a resolution of 5 cm or less. Thereby, the precision in discrimination between accumulated snow and powder snow covering the frozen road surface can also be improved. Alternatively, the distribution information of the moisture amount may be obtained with a resolution of 1 cm or less. Thereby, the precision in recognition between compacted snow and fresh snow can be improved.

For example, every time when moving body 1A travels at least 5 cm or 1 cm, the moisture information of the road surface may be obtained one time or more. For example, in the case where moving body 1A is a vehicle and is traveling at about 100 km per hour or less, the measurement interval (sampling rate) of moisture information obtainer 110 may be 1.8 ms or less. Thereby, the measurement can be performed one time or more for each 5 cm move. The measurement interval of moisture information obtainer 110 may be 0.3 ms or less. Thereby, the measurement can be performed one time or more for each 1 cm move.

As illustrated in FIG. 6, position information obtainer 120 includes GPS receiver 121. GPS receiver 121 receives radiowaves from a GPS satellite to obtain the position information.

Controller 170 controls the components included in moving body 1A. Controller 170 is implemented with a non-volatile memory which stores programs, a volatile memory which is a transient memory region for executing programs, an input/output port, and a processor which executes the programs.

Moving velocity measurer 180 measures the moving velocity of moving body 1A. Moving velocity measurer 180 is implemented with a sensor which detects the rotational speed of a wheel, for example, and calculates the moving velocity of moving body 1A based on the detected rotational speed. Alternatively, moving velocity measurer 180 may calculate the moving velocity of moving body 1A based on the position information obtained by GPS receiver 121. Alternatively, moving velocity measurer 180 may calculate the moving velocity both from the position information obtained by GPS receiver 121 and from the rotational speed detected by the sensor disposed in the wheel.

Time obtainer 190 is a timer which obtains a time.

The operations of road surface condition prediction systems 1 to 1d according to the present embodiment will now be described. The operation of road surface condition prediction system 1d illustrated in FIG. 6 will be described below as one example.

Figure 7:
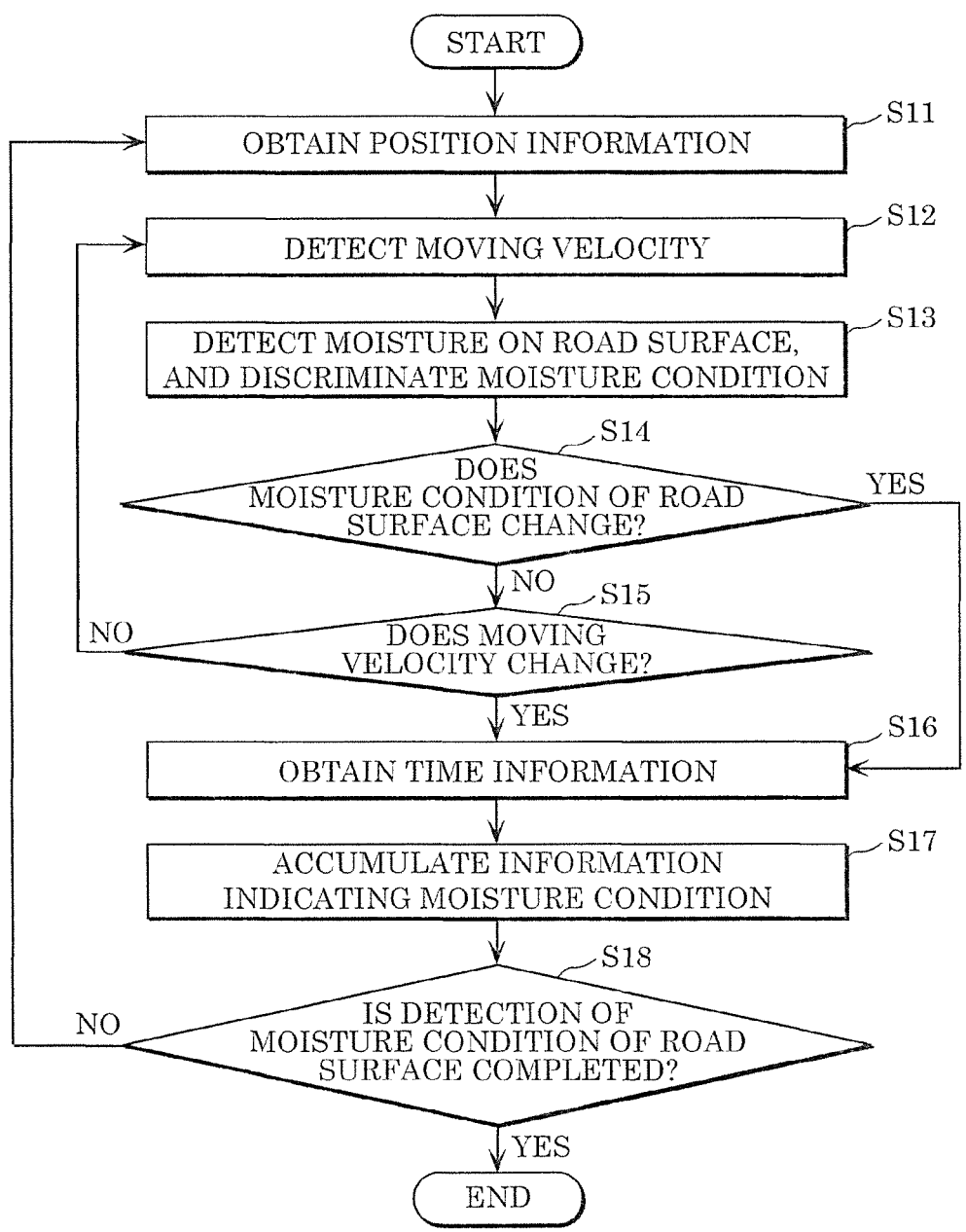
FIG. 7 is a flowchart illustrating processing of acquiring moisture information by the road surface condition prediction system according to Embodiment 1.

A flow of processing to obtain the moisture information by road surface condition prediction system 1d according to the present embodiment will now be described with reference to FIG. 7. FIG. 7 is a flowchart illustrating processing to obtain the moisture information by road surface condition prediction system 1d according to the present embodiment. Specifically, FIG. 7 illustrates processing to detect the moisture condition of the road surface in moving body 1A.

Controller 170 starts the processing to detect the moisture condition of the road surface. For example, controller 170 starts the processing to detect the moisture condition at a timing when the traveling of moving body 1A starts. Controller 170 operates time obtainer 190 at the same time when controller 170 starts the processing to detect the moisture condition, and records the start time of the detection processing in a memory.

In step S11, first, position information obtainer 120 obtains position information. Specifically, GPS receiver 121 obtains the position information.

In step S12, moving velocity measurer 180 then measures the moving velocity. The processing to measure the moving velocity does not need to be performed.

In step S13, moisture information obtainer 110 then detects the moisture to discriminate the moisture condition. Specifically, based on the control by controller 170, the road surface is irradiated with absorption light, which has an absorption peak near that of water, from near-infrared light source 111. The scatter-reflected light of the absorption light from the road surface is received by light detector 112. Discriminator 114 stores the intensity of the received light in the memory. Based on the control of controller 170, the road surface is then irradiated with reference light, which has an absorption peak other than that of water, from near-infrared light source 111. The scatter-reflected light of the reference light from the road surface is received by light detector 112. Discriminator 114 stores the intensity of the received light in the memory.

Based on the intensity stored in the memory, discriminator 114 discriminates the presence/absence of water, ice, or snow. Based on the road surface temperature measured by radiation temperature measurer 113, discriminator 114 discriminates water from ice. The absorption of sunlight by the moisture is determined by measuring the intensity of the absorption light or scatter-reflected light of the reference light by the road surface. A visible light receiving device such as a camera may be used as a means for measuring the absorption of sunlight. Thereby, change rates of evaporation, unfreezing, and melting snow can be calculated with higher precision.

In step S14, discriminator 114 then determines whether the moisture condition of the road surface changes or not. The change in the moisture condition indicates that one state of dryness, water, snow, or ice changes to another state. For example, by comparing the result of discrimination based on the detection of the moisture performed immediately before to the result of discrimination currently performed, discriminator 114 determines whether there is such a change or not.

In the case where it is determined that there is no change in the moisture condition in step S14 (No), then in step S15, controller 170 determines whether there is any change in the moving velocity of moving body 1A or not. In the case where controller 170 determines in step S15 that there is no change in moving velocity (No), the process returns to step S12 to repeat the processing described above. In the case where there is no change in the moisture condition or the moving velocity, the accumulation of data does not need to be performed because the data immediately before the determination can be used.

In the case where it is determined in step S14 that there is a change in the moisture condition (Yes) or is determined in step S15 that there is a change in the moving velocity (Yes), controller 170 obtains the time information from time obtainer 190 in step S16.

In step S17, accumulator 230 then accumulates the data such as the state information indicating the moisture condition. For example, moving body 1A transmits the time information, the position information, the state information, and speed information to information center 2 via a communicator (not illustrated).

In information center 2, collector 210 obtains the transmitted time information, position information, state information, and speed information. Accumulator 230 accumulates the time information, the position information, the state information, and the speed information in storage 240 in association to the weather information. The weather information indicates the weather of the date and time indicated by the time information and obtained by weather information obtainer 250. Although an example in which the data is accumulated in information center 2 has been described here, the data may be accumulated in the storage included in moving body 1A.

In step S18, it is determined whether the processing to detect the moisture condition is completed or not. In the case where it is determined in step S18 that the detection processing is not completed, the processing returns to step S11 to repeat the processing described above. Whether the processing to detect the moisture condition is completed or not is determined by controller 170 based on the information indicating that moving body 1A has traveled the preset route or that moving body 1A has stopped the travel.

The accumulated data (including the state information) obtained based on the result of detection of the moisture on the road surface according to the present embodiment will now be described with reference to FIG. 8. FIG. 8 is a table illustrating one example of accumulated data 241 accumulated in storage 240 of road surface condition prediction system 1d according to the present embodiment.

For example, accumulated data 241 includes the time information indicating the date and time in association with the position information, the state information indicating the moisture condition of the road surface, and the speed information indicating the moving velocity. Furthermore, the weather information, i.e., weather, air temperature, rainfall, snowfall, wind direction, sunshine duration, humidity, and atmospheric pressure information are included in association therewith.

As illustrated in FIG. 8, because the time information, the position information, the state information, and the speed information are stored in association with each other, the moisture distribution at any spot on the road can be known by multiplying the time calculated from the time information by the moving velocity.

Accumulated data 241 may include not only the information collected by collector 210 but also the results of prediction performed by predictor 220. Specifically, accumulator 230 may store the results of prediction at the target time and position as the state information in storage 240 in association with the weather information of the target time.

Figure 9:
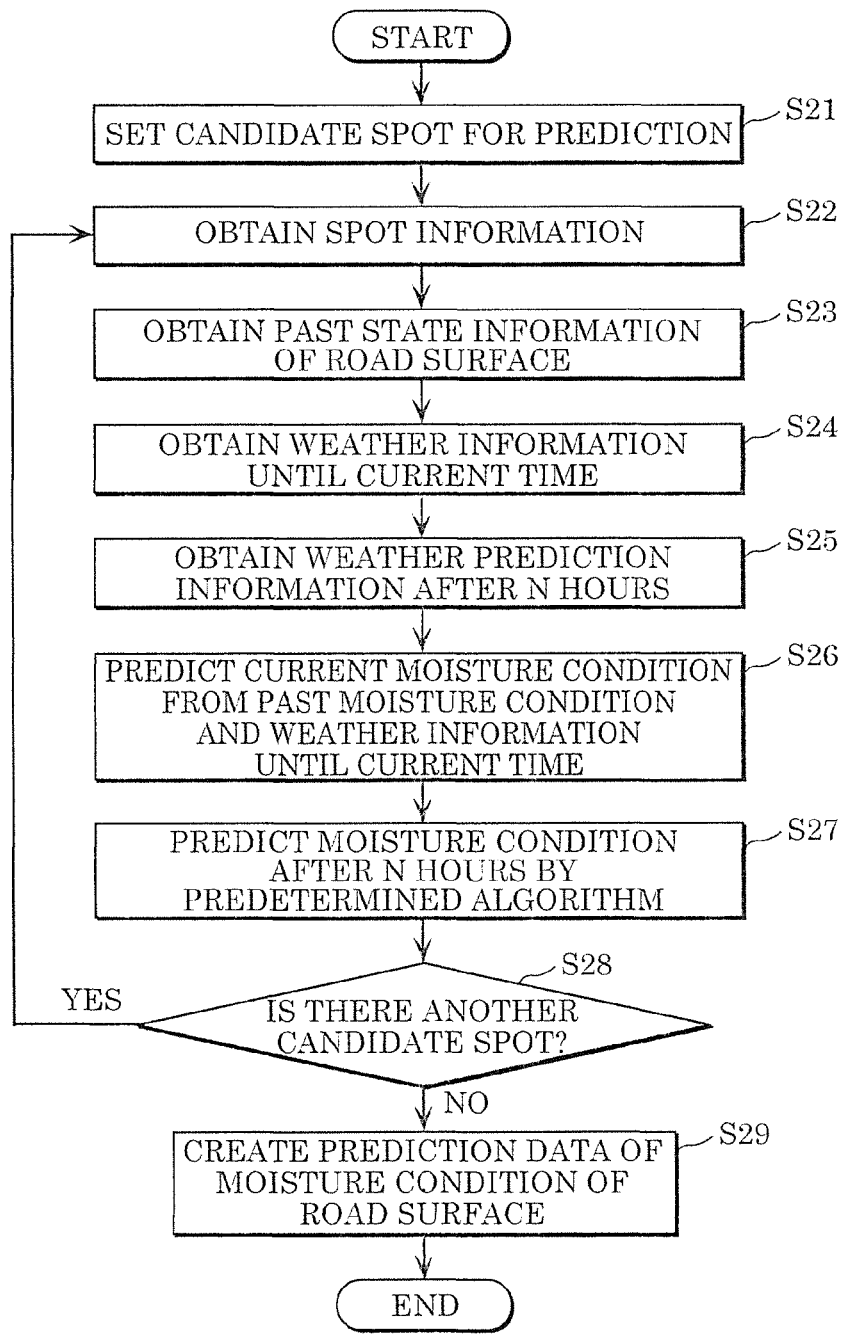
FIG. 9 is a flowchart illustrating processing to predict the moisture condition on a road surface by the road surface condition prediction system according to Embodiment 1.

The processing to predict the moisture condition on the road surface will now be described with reference to FIG. 9. FIG. 9 is a flowchart illustrating one example of the processing to predict the moisture condition on the road surface by road surface condition prediction system 1d according to the present embodiment.

First, one or more candidate spots to be predicted are set in step S21. A candidate spot is represented by a combination of a latitude and a longitude. For example, predictor 220 presents the candidate spots on an input screen or a selection screen on a display or the like to receive the selection from a user. The candidates for selection displayed in the selection screen are, for example, all pieces of position information included in accumulated data 241.

Alternatively, predictor 220 may display a map, and the candidate spot may be set through selection of a position on the map. Alternatively, predictor 220 may display an input screen for direct input of the latitude and the longitude, the name of the candidate spot, or the management number of the road.

In step S22, predictor 220 then selects one of the one or more candidate spots set in step S21, and obtains the latitude and longitude of the selected candidate spot. The candidate spot selected in step S22 is the target position for prediction.

In step S23, predictor 220 then obtains the state information of the road surface at the target position in the past. Specifically, predictor 220 reads the data corresponding to the latitude and longitude of the target position from accumulated data 241 stored in storage 240. Specifically, predictor 220 obtains the time information, the state information, and the weather information of the target position.

In step S24, weather information obtainer 250 then obtains the weather information at the target position until the current time. In the case where the target time for prediction is a time in the past (a time before the current time, weather information obtainer 250 obtains the weather information at the target position until the target time.

In step S25, weather information obtainer 250 then obtains weather prediction information after N hours from the current time. The weather prediction information is a so-called weather forecast, which is obtained by weather information obtainer 250 from a weather bureau or the like.

In step S26, predictor 220 then predicts the moisture condition of the road surface at the current time based on the moisture condition of the road surface in the past and the weather information until the current time.

In step S27, predictor 220 then predicts the moisture condition of the road surface after N hours at the target position by executing a predetermined algorithm. The detailed algorithms for prediction processing used in steps S26 and S27 will be described later with reference to FIG. 10.

In step S28, predictor 220 then determines whether there is any candidate spot not subjected to the prediction among the one or more candidate spots for prediction set in step S21. When there is a candidate spot not subjected to the prediction (Yes), the processing returns to step S22 to repeat the processing described above.

When any candidate spot not subjected to the prediction is not present in step S28 (No), in step S29, predictor 220 creates prediction data, which is a collection of the results of prediction of the spots. The prediction data may be represented as a combination of position information with the result of prediction for easy handling of the information. Alternatively, the result of prediction may be displayed on the map for improved viewability of the information.

In steps S26 and S27, a change in the moisture distribution is predicted from the latest moisture condition of the road surface, the latest moisture distribution, the latest weather information, and the current weather information. Basically, when the moisture detected lately is water, water gradually decreases thereafter due to evaporation when the air temperature increases without raining or snowing. At this time, it takes some time for water to disappear when the region of water detected is wide, and water disappears quickly when the region is narrow.

On the other hand, the possibility of freezing of the moisture increases when the air temperature decreases and the road surface temperature is below 0° C. The weather information at the time when the moisture information is obtained is also referred because the heat radiation from the road surface and the heat amount accumulated on the road surface due to the weather in the past other than the air temperature are related with the change in road surface temperature.

When the moisture detected at the latest time is snow and the road surface temperature is less than 0° C., the state of snow is maintained. When the road surface temperature exceeds 0° C., melting snow starts. When the road surface temperature falls below 0° C. in this state, the road surface freezes.

Similarly when the moisture detected at the latest time is ice, a road surface temperature of 0° C. is the boundary whether the moisture maintains the state of ice or changes to water. Furthermore, it can also be predicted from a change in weather thereafter whether the road surface freezes again or gets dry.

At this time, irrespective of whether the moisture condition is snow or ice, the prediction is preformed according to the size (area) thereof and the weather information by calculating the time until snow or ice melts or disappears. Furthermore, the prediction can also be performed through machine learning of the relation between the road surface condition and the weather information illustrated in FIG. 8. Any of the prediction methods above can improve the precision in prediction by knowing which state of dryness, water, snow, and ice the road surface condition has and the proportions of these regions.

One example of an algorithm used for prediction of the moisture condition will now be described.

Figure 10:
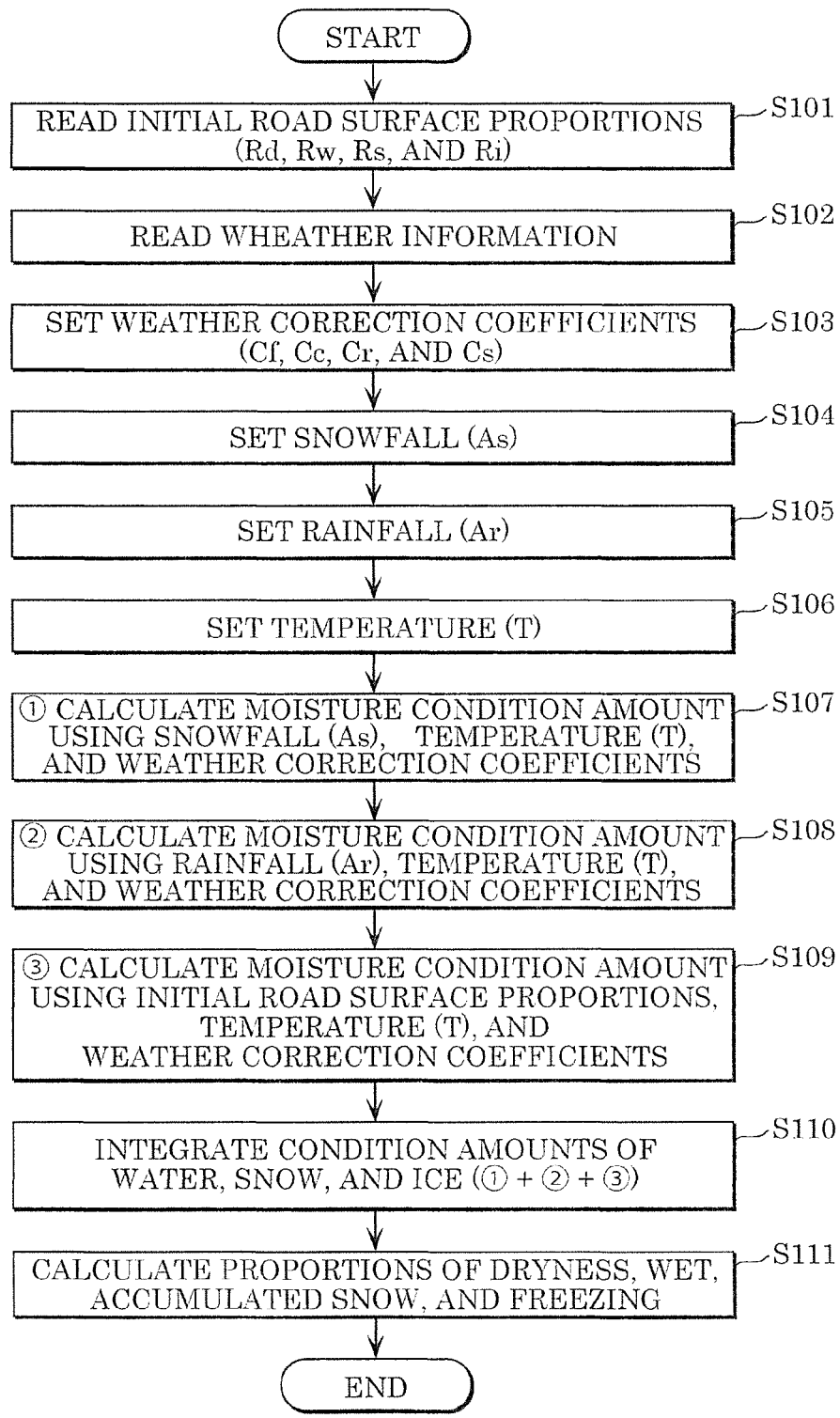
FIG. 10 is a flowchart illustrating a prediction algorithm of the road surface condition prediction system according to Embodiment 1.

One example of a predetermined algorithm in steps S26 and S27 of FIG. 9 will now be described with reference to FIG. 10. FIG. 10 is a flowchart illustrating a prediction algorithm used in the road surface condition prediction system according to the present embodiment.

First, in step S101, predictor 220 reads the initial road surface proportions ($R_d$, $R_w$, $R_s$, and $R_i$). The suffixes d, w, s, and i of the symbols representing the road surface proportions represent dryness, wet, accumulated snow, and freezing, respectively. $R_d+R_w+R_s+R_i=1$. In other words, the total of the road surface proportions is 1.

Specifically, from accumulated data 241, predictor 220 obtains the proportions of water, snow, and ice at the target position for prediction as the road surface proportions. For example, accumulated data 241 illustrated in FIG. 8 includes twelve pieces of state information at a single position represented by the same latitude and longitude. One of the twelve pieces of state information indicates water, and $R_w=1/12\approx0.08$. Two of them indicate ice, and $R_i=2/12\approx0.17$. Nine of then indicate snow, and $R_s=9/12\approx0.75$. None of them indicates dryness, and $R_d=0.0$.

In step S102, predictor 220 then reads the weather information. Specifically, predictor 220 reads the weather information after N hours from the current time, the weather information being obtained by weather information obtainer 250 in steps S24 and S25.

In step S103, predictor 220 then sets weather correction coefficients $C_f$, $C_c$, $C_r$, and $C_s$. The suffixes f, c, r, and s in the symbols representing the weather correction coefficient represent sun, cloud, rain, and snow, respectively. Each weather correction coefficient represents the likeliness of state transition of the moisture in the corresponding weather. For example, in the case where ice turns into water, or vice versa, or snow turns into water, the weather correction coefficient is set at Cf=1 for sun, at Cc=0.8 for cloud, and the like. The set values may be updated to the optimal values whenever necessary by performing machine learning at each spot for prediction after the initial values are given. Thereby, the prediction can be performed with higher precision.

In step S104, predictor 220 then sets snowfall As. Snowfall As is the snowfall [cm] included in the weather information read in step S102.

In step S105, predictor 220 then sets rainfall Ar. Rainfall Ar is the rainfall [mm] included in the weather information read in step S102.

In step S106, predictor 220 then sets temperature T. Temperature T is the air temperature [° C.] included in weather information read in step S102.

In the case where at least one of the snowfall, the rainfall, and the air temperature is not included in the weather information, the corresponding step may be omitted. In the case where pieces of weather information having different times are read in step S102, the snowfall, the rainfall, and the air temperature are set for each of the times.

In steps S107, S108, and S109, predictor 220 then calculates the moisture condition using the snowfall, the rainfall, the initial road surface proportions, the weather correction coefficients, and the temperature. Steps S107 to S109 may be performed in any order, and may be executed simultaneously in parallel processing.

First, in step S107, predictor 220 calculates the amount of snow in snowfall As which transits to water. For example, a model is used in which the amount of snow does not change when temperature T is less than 0° C., and snow turns to water proportional to temperature T when temperature T is 0° C. or higher. Predictor 220 multiplies the changed amount of snow by the weather correction coefficient to correct the change amount from snow to water.

In step S108, predictor 220 calculates the amount of rain in rainfall Ar which disappears or transits to ice. For example, a model is used in which water turns to ice proportional to the absolute value of temperature T when temperature T is less than 0° C., and water disappears proportional to temperature T when temperature T is 0° C. or higher. Predictor 220 multiplies the changed amount of water by the weather correction coefficient to correct the change amount of water to ice or the amount of water which disappeared.

In step S109, predictor 220 calculates the amount of change in each of the initial road surface proportions Rd, Rw, Rs, and Ri caused by the state transition of water. In step S109, the calculation can be performed based on the model similar to those in steps S107 and S108.

In step S110, predictor 220 integrates the amounts of the moisture conditions, which are obtained through the calculations in steps S107, S108 and S109, for each state of water, snow, and ice.

Finally, in step S111, predictor 220 calculates the proportions of dryness, wet, accumulated snow, and freezing. The proportion of dryness is the value obtained by subtracting the sum of the proportions of wet, accumulated snow, and freezing from 1.

The prediction algorithm illustrated in FIG. 10 is one example using the weather information and the initial road surface proportions indicating the size of the moisture distribution. Any other prediction algorithm can be used. A modification of the transition model of the moisture condition, the addition of parameters for calculation, or application of a machine learning method may be used. Needless to say, appropriate modifications enable prediction with higher precision.

One example where prediction was actually performed will now be described with reference to FIG. 11. FIG. 11 is a diagram illustrating one example of the result of prediction of the moisture condition. (a) of FIG. 11 illustrates the result of prediction when dryness:wet:accumulated snow:freezing=0.3:0:0.25:0.45 as the initial road surface proportions, the weather is cloud, and the temperature is 5° C. The columns of (a) of FIG. 11 indicate the values obtained in the steps described in FIG. 10. The bottom column of (a) of FIG. 11 indicates the predicted values (specifically, the predicted road surface proportions).

Compared between the initial road surface proportions and the predicted values in (a) of FIG. 11, wet road surfaces and dry road surfaces are increased. In the example illustrated in (a) of FIG. 11, the snowfall and the rainfall are 0. From this, it can be inferred that melting of accumulated snow and unfreezing is accelerated by the influences of the weather and the air temperature. For this reason, it shows that the prediction can be performed with precision similarly to the result of inference.

(b) of FIG. 11 illustrates the result of prediction when dryness:wet:accumulated snow:freezing=0.3:0.25:0.45:0 as the initial road surface proportions, the weather is snow, and the temperature is −5° C. (b) of FIG. 11 shows that an increase in accumulated snow because of snowing and the transition of the wet region to freezing can be predicted.

Although the method of predicting the transition of the road surface proportions dryness:wet:accumulated snow:freezing has been described here, a similar method can be used as a method of predicting the thickness of the moisture on the road surface, and the transition of the temperature. Also in the case where a change in thickness of the moisture is predicted, the prediction is started based on initial thickness information of the moisture on the road surface and the weather information, and the state in the future is predicted based on information such as the snowfall, the rainfall, and the air temperature, for example.

In both of the prediction of the road surface proportion and that of the thickness, the moisture temperature can be predicted based on the product of the absorption of sunlight by the moisture surface multiplied by the amount of solar radiation, and the moisture condition of the road surface can be predicted from the moisture temperature. At this time, the information indicating the moisture temperature on the road surface at the time when the measurement is performed by moisture information obtainer 110 is also an important index to the prediction.

In the present embodiment, the size of the distribution of the moisture condition can be known from the moving velocity of the moving body and the time information. Accordingly, while road surface condition prediction system 1 according to the present embodiment has a simple configuration including moisture information obtainer 110 of a spot type, road surface condition prediction system 1 can predict the moisture condition of the road surface with high precision. Furthermore, in road surface condition prediction system 1 according to the present embodiment, accumulator 230 in information center 2 may have a function to update the accumulated information.

Figure 12:
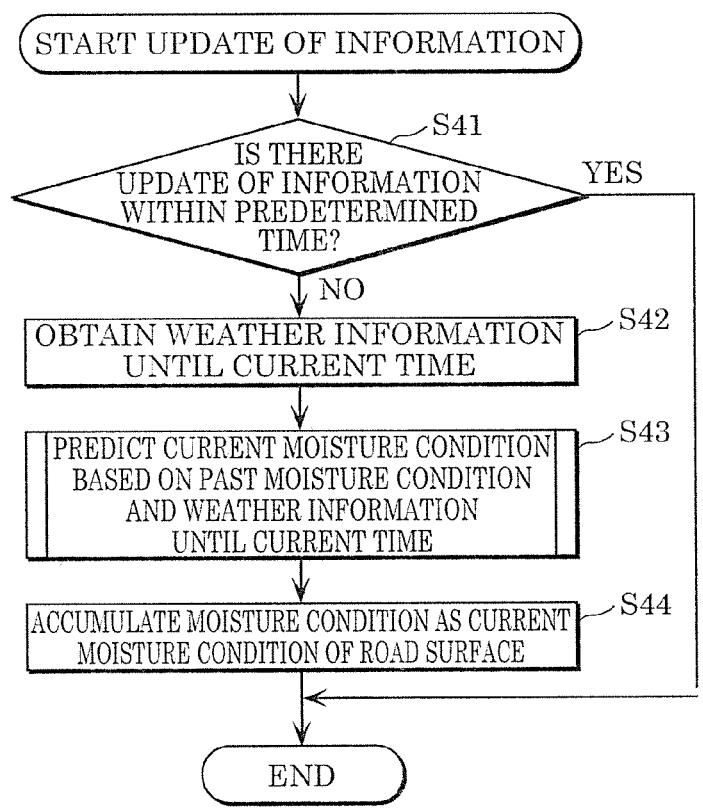
FIG. 12 is a flowchart illustrating processing to update information by the road surface condition prediction system according to Embodiment 1.

FIG. 12 is a flowchart illustrating processing to update information by road surface condition prediction system 1d according to the present embodiment.

As illustrated in FIG. 12, accumulator 230 starts the processing to update information at a predetermined timing, such as at every noon.

First, in step S41, accumulator 230 determines whether the information indicating the moisture condition of the road surface in a specific spot is updated within a predetermined time or not. The predetermined time is, for example, one hour. For example, accumulator 230 determines whether collector 210 has obtained the position information indicating the specific spot and the state information associated with the position information from one of multiple moving bodies or not. In the case where collector 210 has obtained the position information indicating the specific spot and the state information associated with the position information, accumulator 230 determines that the information has been updated.

In the case where accumulator 230 determines in step S41 that the information has been updated (Yes), it means that the state information indicating the moisture condition of the road surface has been updated lately, and therefore the processing to update information is terminated.

In the case where accumulator 230 determines in step S41 that there was no update of the information (No), in step S42, weather information obtainer 250 obtains the weather information until the current time.

In step S43, predictor 220 then predicts the moisture condition of the road surface at the current time based on the moisture condition of the road surface in the past and the weather information until the current time. Specific processing is similar to the processing in step S26. For example, in step S43, predictor 220 predicts the moisture condition based on the prediction algorithm illustrated in FIG. 10.

In step S44, accumulator 230 then stores the current road surface condition predicted by predictor 220 as the state information in storage 240. Thereby, the processing to update information is terminated.

Thus, accumulator 230 having a function to update the information can update accumulated data 241 at every predetermined time to maintain the information as fresh as possible. Thereby, predictor 220 can perform highly precise prediction. Even when the state information and the position information are not newly collected from the moving body, the moisture condition of the road surface is updated at every predetermined time. For this reason, such updated moisture condition can be always used as new prediction data of the moisture condition.

Embodiment 2

The road surface condition prediction system according to Embodiment 2 will now be described with reference to FIG. 13.

Figure 13:
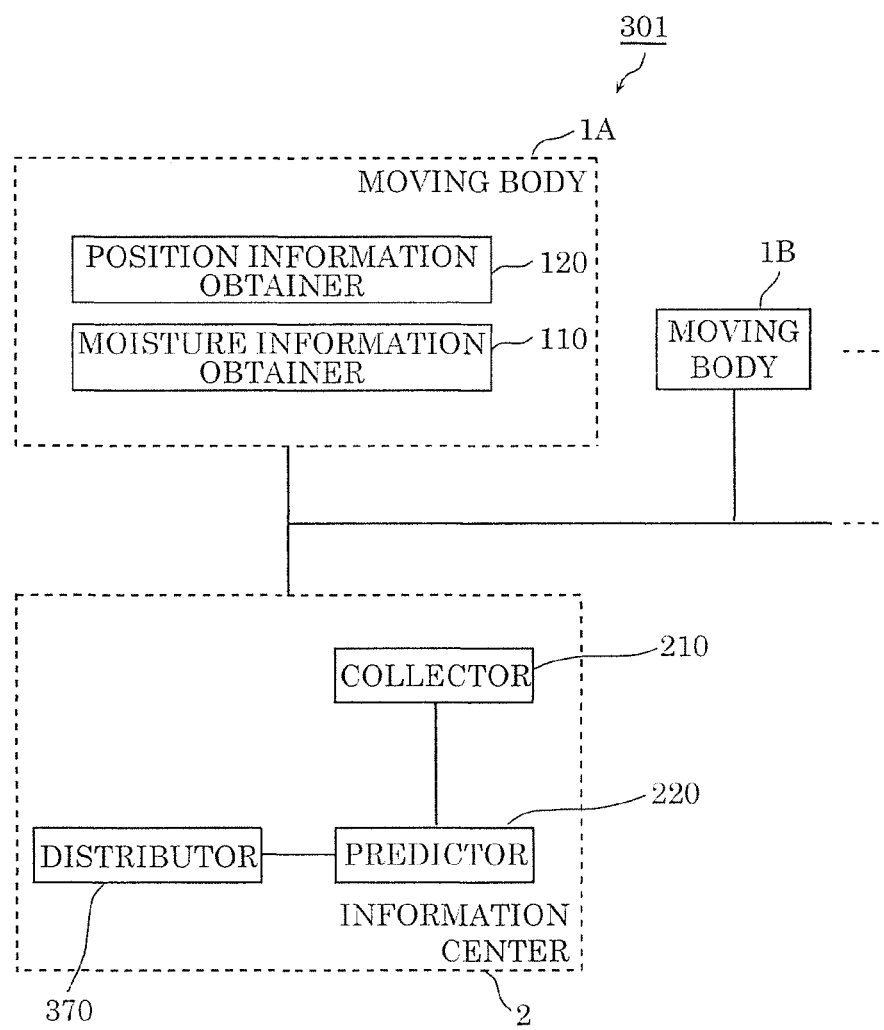
FIG. 13 is a block diagram illustrating a configuration of a road surface condition prediction system according to Embodiment 2.

FIG. 13 is a block diagram illustrating a configuration of road surface condition prediction system 301 according to the present embodiment.

Unlike road surface condition prediction system 1 illustrated in FIG. 2, road surface condition prediction system 301 further includes distributor 370 as illustrated in FIG. 13. Specifically, information center 2 includes distributor 370.

Distributor 370 distributes distribution information including the result of prediction by predictor 220. Destinations of distribution are vehicles which are traveling, road managers, traffic managers, traffic information business operators, transportation business operators, or mail business operators.

For example, in the case where distributor 370 receives a distribution request from a destination of distribution, distributor 370 distributes the distribution information in response to the distribution request. The distribution information may include not only the result of prediction but also driving allowance information indicating whether automated driving is allowed or not.

The driving allowance information may include not only the allowance of automated driving but also a degree of difficulties in manual driving. For example, the driving allowance information may include information indicating a difficulty level of travel, a degree of increase in probability of traffic accidents, or a speed limit. At this time, the driving allowance information may indicate a degree of difficulties of driving for each vehicle type. For example, the driving allowance information may indicate that vehicles with snow tires can travel but vehicles with normal tires cannot because of accumulated snow on the road surface.

Moreover, the driving allowance information may include information indicating entities which may be obstructions to automated driving or manual driving, such as the presence/absence of white lines, the visibility of white lines according to accumulated snow, the presence/absence of depressions or crack of the road, the presence/absence of rockfall or fallen trees, and generation of fog. Such information is obtained from an image captured by a visible camera mounted on moving body 1A, is transmitted to information center 2 together with the moisture information, and is stored in storage 240, for example.

Thus, road surface condition prediction system 301 according to the present embodiment including distributor 370 can provide the result of prediction of the moisture condition to road users, road managers, traffic managers, and traffic information business operators, for example. Thereby, useful information for selection of safe roads by the road users or operation of safety measures against dangerous roads (for example, application of a snow melting agent or a freeze preventing agent) by the road managers can be provided.

In addition, road surface condition prediction system 301 can provide information useful for providing the restriction on use of dangerous roads by the traffic managers or providing traffic information to the road users by the traffic information business operators.

The moisture condition can be predicted with higher precision in the present embodiment used in combination with a variety of configurations described in Embodiment 1.

Embodiment 3

The road surface condition prediction system according to Embodiment 3 will now be described with reference to FIG. 14.

Figure 14:
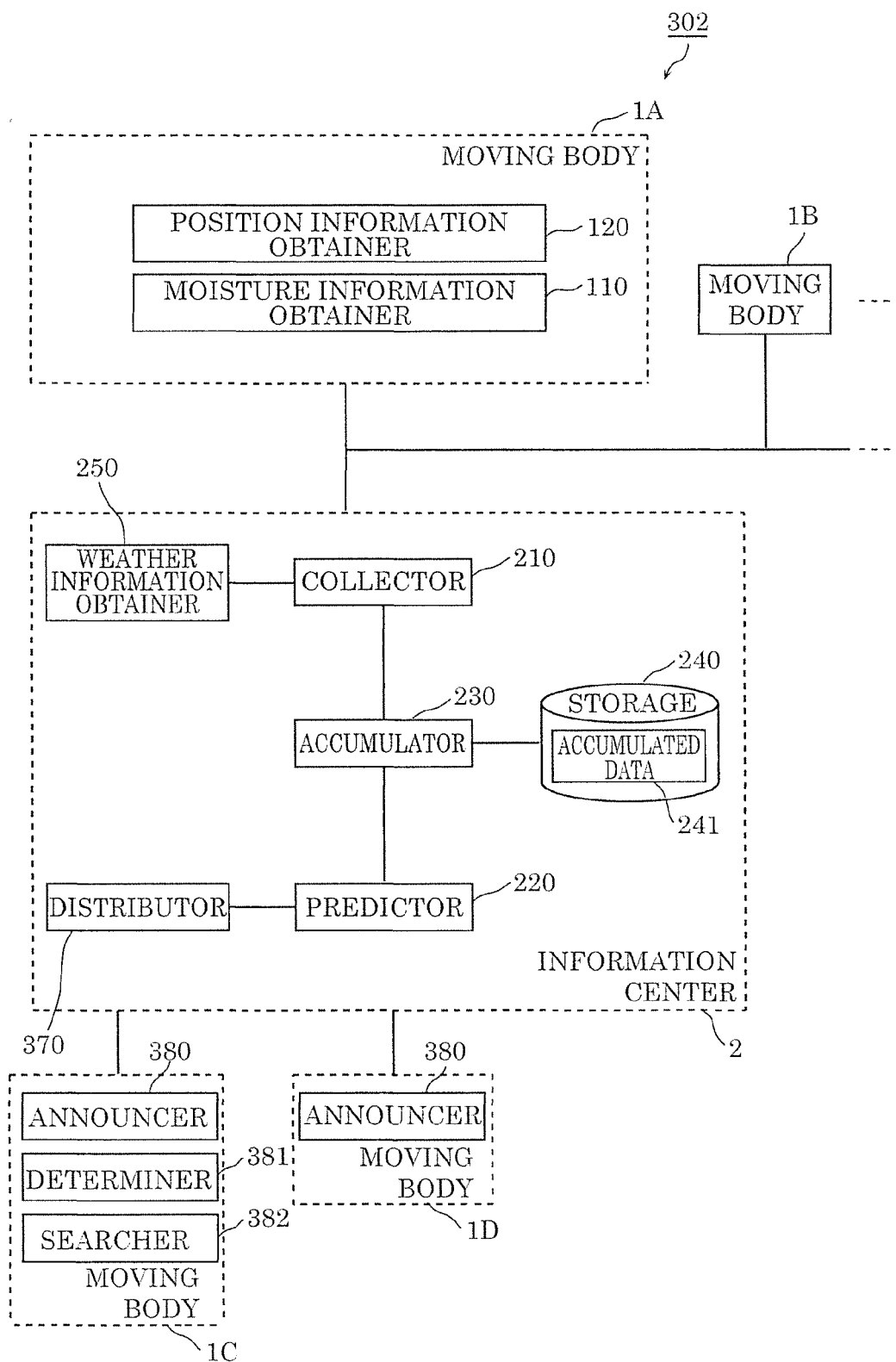
FIG. 14 is a block diagram illustrating a configuration of a road surface condition prediction system according to Embodiment 3.

FIG. 14 is a block diagram illustrating a configuration of road surface condition prediction system 302 according to the present embodiment.

Unlike road surface condition prediction system 1b illustrated in FIG. 4, road surface condition prediction system 302 further includes distributor 370, announcer 380, determiner 381, and searcher 382, as illustrated in FIG. 14. Moving body 1A illustrated in FIG. 14 may include environmental information obtainer 130.

As illustrated in FIG. 14, in road surface condition prediction system 302, distributor 370 in information center 2 distributes the distribution information to multiple moving bodies 1C and 1D. Moving bodies 1C and 1D are moving bodies which do not have the function to detect the moisture on the road surface. Moving bodies 1C and 1D are, for example, vehicles traveling on the road surface, such as four-wheeled vehicles or two-wheeled vehicles, but not limited thereto.

Moving bodies 1C and 1D each include announcer 380. Announcer 380 announces the result of prediction by predictor 220. Specifically, in the case where freezing of the road surface, accumulated snow, or puddles are predicted in the course of moving body 1C or 1D, announcer 380 warns the driver by an image, a speech sound, or an audio sound. Announcer 380 is, for example, a display or a speaker.

Announcer 380 may cooperate with a car navigation system mounted on moving body 1C. For example, as illustrated in FIG. 14, moving body 1C includes determiner 381 and searcher 382.

Based on the result of prediction by predictor 220, determiner 381 determines whether the road is passable. Specifically, determiner 381 determines whether there is freezing of the road surface, accumulated snow, or puddles on the route to the destination, and determinates that the road is not passable when there is freezing of the road surface, accumulated snow, or puddles.

Searcher 382 searches for a bypass when determiner 381 determines that the road is not passable. Among multiple routes which each connect the current location of moving body 1C to the destination, searcher 382 selects a shortest route in which moving body 1C can travel, as a bypass. Searcher 382 may search for multiple bypasses.

Announcer 380 further announces the bypass searched by searcher 382. For example, announcer 380 presents a map which displays the bypass.

Although an example in which moving bodies 1C and 1D each include announcer 380 has been described in the present embodiment, moving bodies 1A and 1B may include announcer 380. Alternatively, announcer 380 may be installed on the side of the road, for example. In this case, the result of prediction of the moisture condition of the road surface can be provided not only to the driver of the moving body but also walkers walking on the road.

Alternatively, moving body 1C does not need to include determiner 381 and searcher 382. Information center 2 may include determiner 381 and searcher 382. For example, when requesting the distribution information, moving body 1C transmits the position information indicating the position of moving body 1C. Based on the position information of moving body 1C, determiner 381 determines whether the road ahead of the travel route of moving body 1C is passable. In the case where determiner 381 determines that the road is not passable, distributor 370 may include the information indicating the bypass searched by searcher 382 in the distribution information, and distribute the distribution information to moving body 1C.

The moisture condition can be predicted with higher precision in the present embodiment used in combination with a variety of configurations described in Embodiment 1.

Embodiment 4

The road surface condition prediction system according to Embodiment 4 will now be described with reference to FIGS. 15 and 16.

Figure 15:
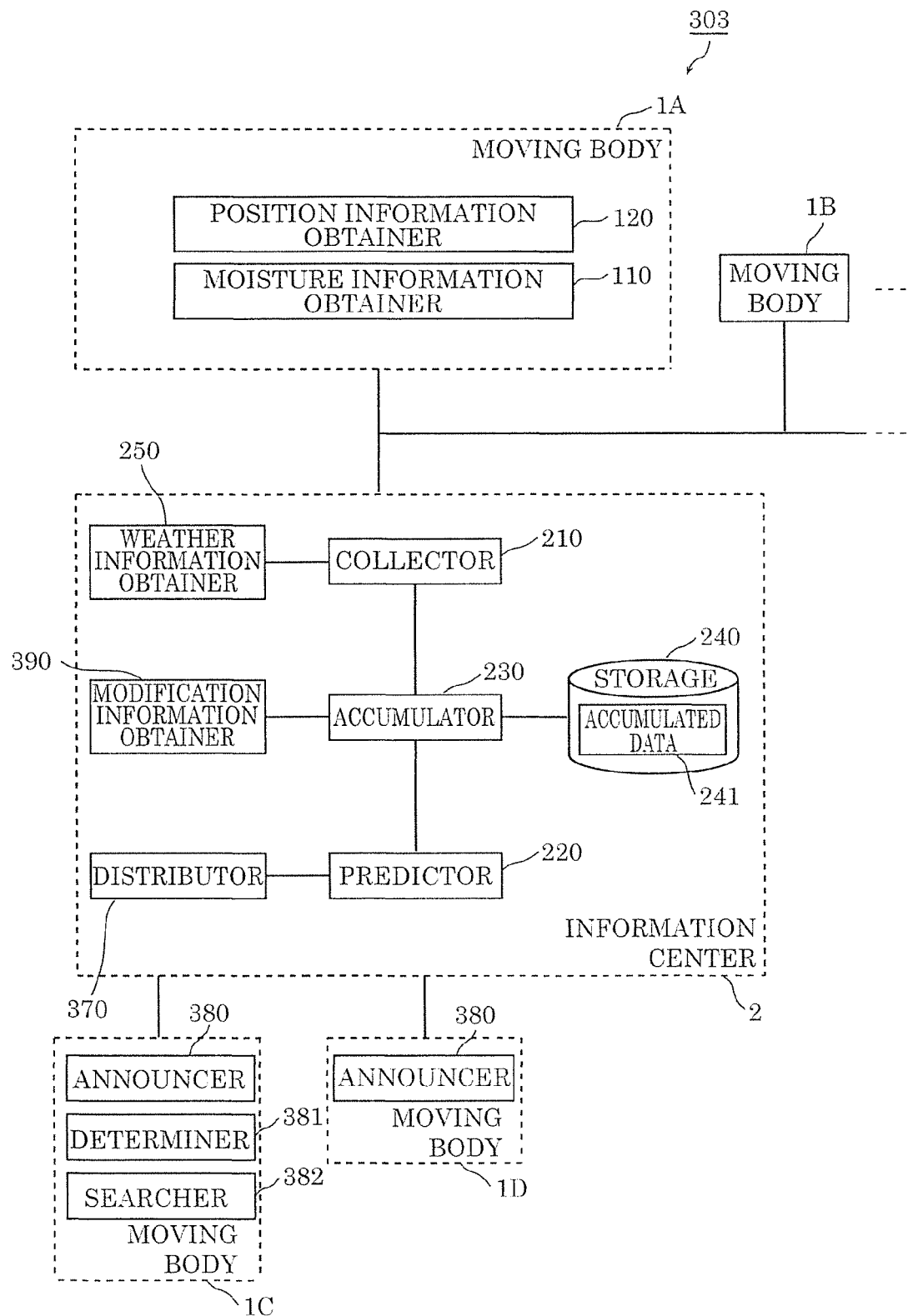
FIG. 15 is a block diagram illustrating a configuration of a road surface condition prediction system according to Embodiment 4.
Figure 16:
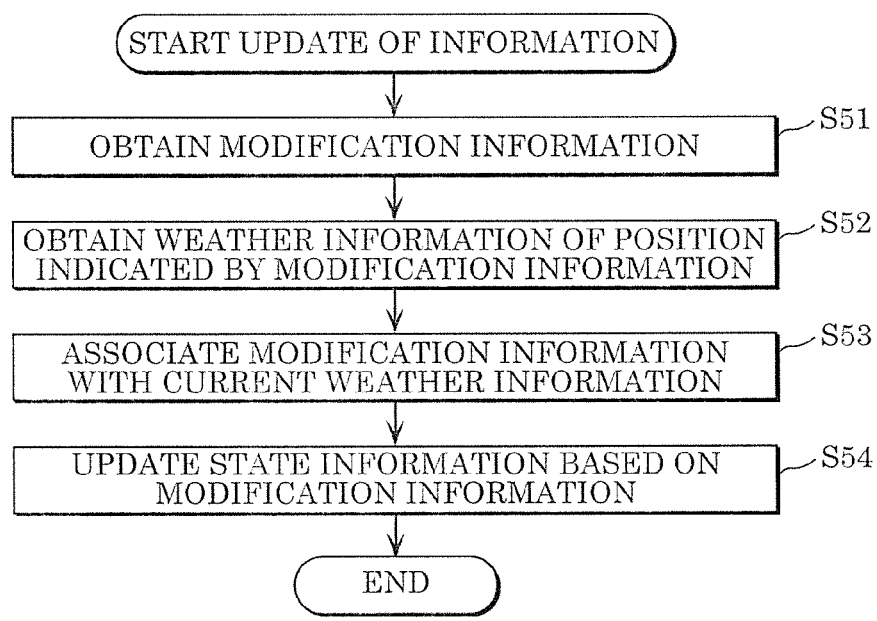
FIG. 16 is a flowchart illustrating processing to update information by the road surface condition prediction system according to Embodiment 4.

FIG. 15 is a block diagram illustrating a configuration of road surface condition prediction system 303 according to the present embodiment.

Unlike road surface condition prediction system 302 illustrated in FIG. 14, road surface condition prediction system 303 further includes modification information obtainer 390 as illustrated in FIG. 15. In the present embodiment, information center 2 includes modification information obtainer 390.

Modification information obtainer 390 is one example of a third obtainer which obtains modification information on modifications of roads. Modification information obtainer 390 obtains the modification information through wireless or wired communication from external devices.

The modification information is the information indicating the position of the road which is modified, and the content of the modification. The modifications of the roads include operations performed by road managers such as removal of snow, drainage of water, and unfreezing, for example. The modifications of the roads may also include the application of a snow removal agent or a freeze preventing agent. The modification information may include the state information indicating the moisture condition of the road surface based on the result of detection of the moisture performed after the modification of the road performed by the road manager.

Based on the modification information, accumulator 230 updates the state information included in accumulated data 241, which is stored in storage 240. For example, in the case where the state information is included in the modification information, accumulator 230 replaces the state information in accumulated data 241 corresponding to the position included in the modification information with the state information included in the modification information.

Specific processing to update the information will now be described with reference to FIG. 16. FIG. 16 is a flowchart illustrating the processing to update information by road surface condition prediction system 303 according to the present embodiment.

First, in step S51, modification information obtainer 390 obtains the modification information on the modification of the road from an external device. The modification information includes the position of the road modified and the content of the modification.

In step S52, weather information obtainer 250 then obtains the weather information of the position indicated by the modification information.

In step S53, accumulator 230 then associates the modification information with the current weather information.

In step S54, accumulator 230 then updates the state information based on the modification information. Specifically, accumulator 230 accumulates the state information included in the modification information, the position information, and the weather information in association with the current time in storage 240.

For example, in the case where the modification of roads such as removal of snow, drainage of water, or unfreezing is performed by the road manager, the present embodiment can reflect the resulting road surface condition in accumulated data 241. Thereby, the precision in prediction of the moisture condition of the road surface can be enhanced.

The moisture condition can be predicted with higher precision in the present embodiment used in combination with a variety of configurations described in Embodiment 1.

Embodiment 5

The driving assistance system according to Embodiment 5 will now be described with reference to FIG. 17.

Figure 17:
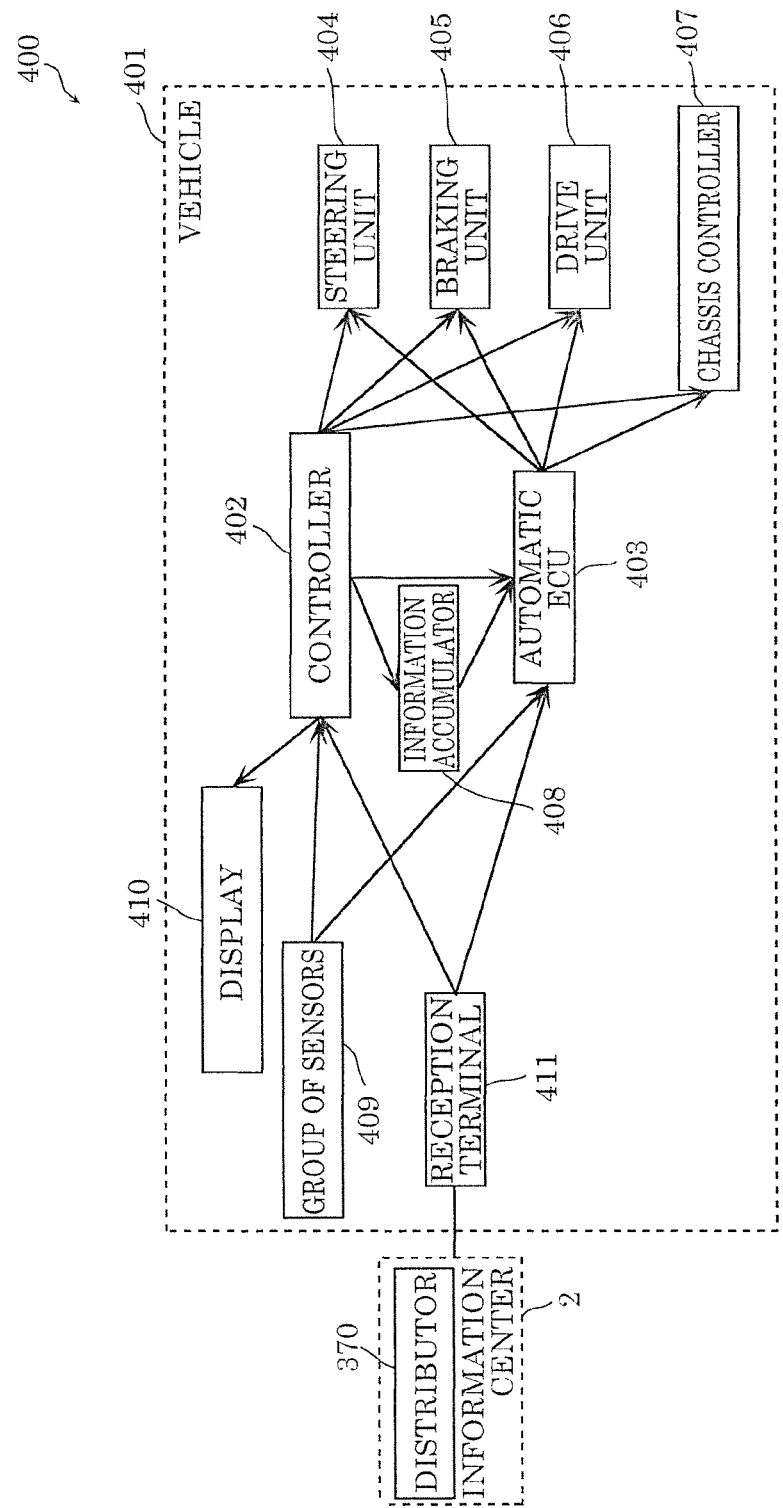
FIG. 17 is a block diagram illustrating a configuration of a driving assistance system according to Embodiment 5.

FIG. 17 is a block diagram illustrating a configuration of driving assistance system 400 according to the present embodiment. Driving assistance system 400 includes road surface condition prediction system 303 described in Embodiment 4, and reception terminal 411 mounted on vehicle 401. FIG. 17 illustrates only distributor 370 in information center 2 in road surface condition prediction system 303.

Vehicle 401 illustrated in FIG. 17 has an automated driving function. As illustrated in FIG. 17, vehicle 401 includes controller 402, automatic engine control unit (ECU) 403, steering unit 404, braking unit 405, drive unit 406, chassis controller 407, information accumulator 408, a group of sensors 409, and display 410. Vehicle 401 further includes reception terminal 411.

Controller 402 is implemented with an arithmetic processor and a memory. Controller 402 mutually transmits signals to and from other components illustrated in FIG. 17. Controller 402 is one example of a controller which assists the automated driving of vehicle 401 based on the distribution information received by reception terminal 411. Specifically, controller 402 assists the automated driving of vehicle 401 based on the result of prediction by predictor 220.

Automatic ECU 403 is a unit which controls the automated driving of vehicle 401. Automatic ECU 403 controls steering unit 404, braking unit 405, and drive unit 406 according to the situations of vehicle 401 and the surrounding situations of vehicle 401.

Steering unit 404 receives an instruction from automatic ECU 403 during automated driving to perform the control related with the traveling direction of vehicle 401.

Braking unit 405 receives an instruction from automatic ECU 403 during automated driving to perform control related with braking of vehicle 401.

Drive unit 406 receives an instruction from automatic ECU 403 during automated driving to perform control related with the engine of vehicle 401 or a motor or a driving mechanism (not illustrated) thereof.

Chassis controller 407 receives an instruction from automatic ECU 403 during automated driving to perform control related with suspension of vehicle 401 (not illustrated).

Information accumulator 408 is a memory which stores information on driving of vehicle 401, such as the driving route of vehicle 401, the surrounding information of vehicle 401, and the information of vehicle 401. Necessary information is read from information accumulator 408 in response to a request from controller 402 or automatic ECU 403.

The group of sensors 409 detects surrounding information of vehicle 401 and the information of the parts of vehicle 401. For example, the group of sensors 409 includes a variety of sensors such as a camera, a millimeter-wave radar, and a speed sensor. The information detected by the group of sensors 409 is output to controller 402 or automatic ECU 403, for example.

Display 410 displays the vehicle information such as the speed, the number of rotations of the engine, and the residual amount of a battery charger, and the surrounding information of the vehicle such as traffic regulations, the positions of its surrounding vehicles, and the road surface condition.

Reception terminal 411 receives the distribution information distributed from distributor 370. Reception terminal 411 receives the distribution information through wireless communication with information center 2. The distribution information includes the result of prediction of the moisture condition of the road surface. The distribution information received by reception terminal 411 is output to controller 402, and is used to assist the automated driving.

The operation of driving assistance system 400 illustrated in FIG. 17 will be described.

Controller 402 determines from an instruction of the driver whether the automated driving is performed or the driver drives. In the case where the automated driving is performed, controller 402 outputs an instruction of automated driving to automatic ECU 403.

In response to the instruction from controller 402, information accumulator 408 sequentially outputs the information, such as the driving route and traffic regulations in the driving route, to automatic ECU 403.

Based on a driving program (not illustrated), the information output from information accumulator 408, and signals from the group of sensors 409, automatic ECU 403 controls steering unit 404, braking unit 405, drive unit 406, and chassis controller 407.

At this time, in the case where the result of prediction included in the distribution information received by reception terminal 411 indicates the presence of freezing, accumulated snow, or puddles in the driving route of vehicle 401, controller 402 outputs the result of prediction to display 410, and may stop the automated driving, so that the control of the vehicle is left to the driver. Alternatively, automatic ECU 403 may control steering unit 404, braking unit 405, drive unit 406, and chassis controller 407, and drive so as to avoid danger.

Alternatively, controller 402 may search for a bypass to change the driving route. In other words, controller 402 may have the same function as those of determiner 381 and searcher 382 illustrated in FIG. 14.

Such a configuration can avoid dangerous places in advance even in spots which the vehicle itself cannot sense, based on the result of prediction of the moisture condition. Alternatively, such a configuration enables the control of the vehicle speed or the suspension, resulting in safe drive.

Vehicle 401 may also include moisture information obtainer 110, predictor 220, accumulator 230, and storage 240. For example, vehicle 401 may detect the moisture on the road surface of the road on which the vehicle has traveled in the past, and store the state information indicating the moisture condition of the road surface in storage 240. Predictor 220 may predict the moisture condition of the road surface based on the data stored in storage 240, and output the result of prediction to controller 402, for example. Thereby, driving assistance based on the result of prediction can be performed without communication with information center 2.

For example, controller 402 may control the speed limit of vehicle 401 based on the result of prediction of the moisture condition of the road surface in the traveling direction. For example, in the case where the result of prediction is snow, controller 402 determines that the speed limit is 60 km/h. In the case where the result of prediction is freezing, controller 402 determines that the speed limit is 40 km/h. In the case where the result of prediction is dryness, controller 402 determines that the speed limit is 100 km/h. It should be noted that these numeric values are only exemplary, and may be appropriately varied according to the type of road or the traffic situations.

Controller 402 determines the speed limit based on the result of prediction, and notifies automatic ECU 403 of the determined speed limit. Automatic ECU 403 performs automated driving within the determined speed limit. At this time, controller 402 may notify a human driver by displaying the determined speed limit on display 410.

Embodiment 6

The road surface condition prediction system according to Embodiment 6 will now be described. In the following description, differences from Embodiment 1 will be mainly described, and the description of shared features will be omitted or simplified.

Figure 18:
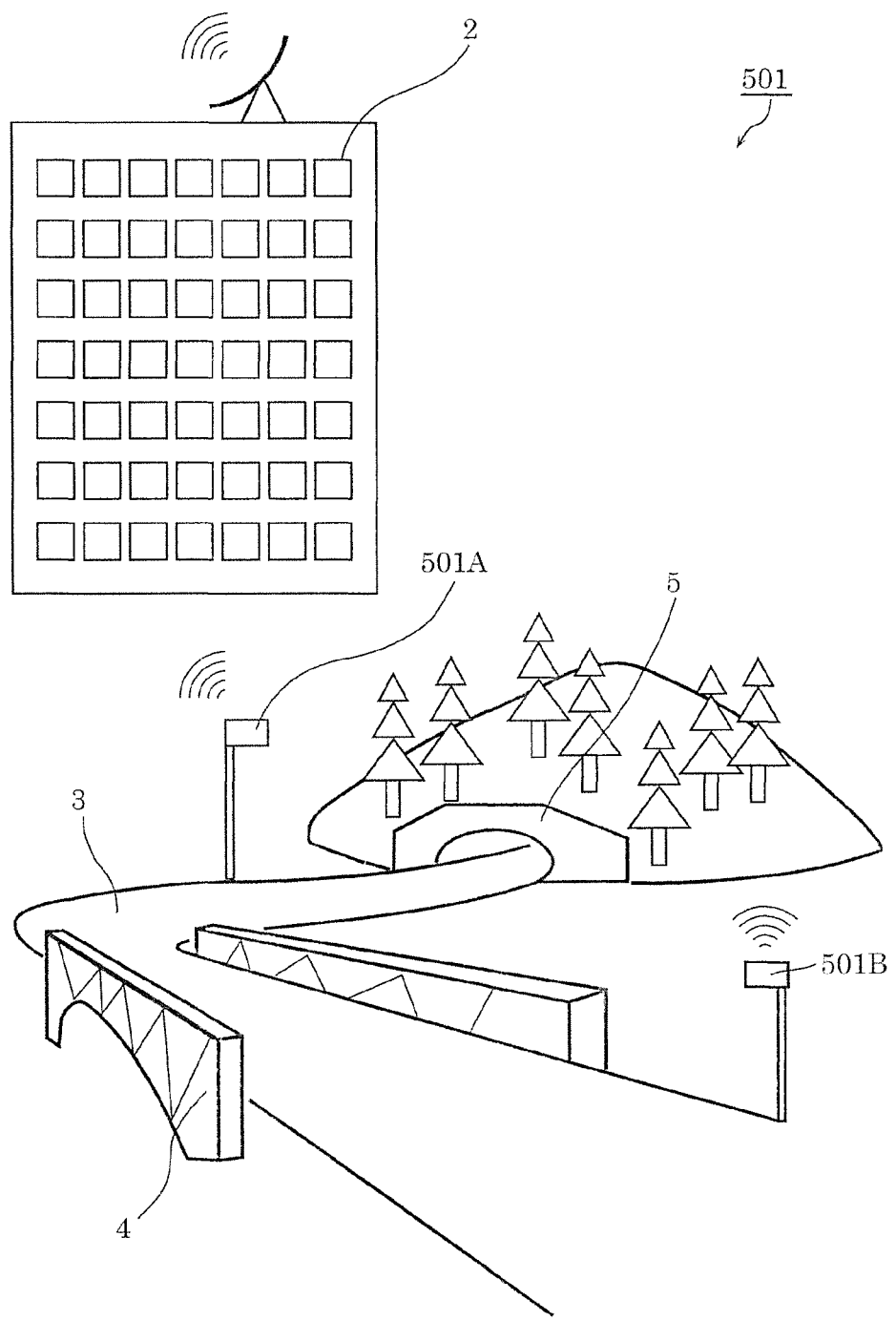
FIG. 18 is a schematic view illustrating an outline of a road surface condition prediction system according to Embodiment 6.

FIG. 18 is a schematic view illustrating an outline of road surface condition prediction system 501 according to Embodiment 6.

FIG. 18 illustrates two monitoring posts 501A and 501B installed on the side of road 3. Monitoring post 501A is installed near exit 5 of a tunnel, for example. Monitoring post 501B is installed near bridge 4. Monitoring posts 501A and 501B can be installed in any other place than those described above, and are installed in spots where the road surfaces should be monitored. Monitoring posts 501A and 501B mutually transmit the information from and to information center 2 through wired or wireless communication.

In the present embodiment, monitoring posts 501A and 501B have a function to detect the moisture on the road surface, similarly to those of moving bodies 1A and 1B according to Embodiment 1. While the area for detection can be changed by travel of moving bodies 1A and 1B in Embodiment 1, monitoring posts 501A and 501B in the present embodiment detect the moisture on the road surface in a predetermined area.

Figure 19:
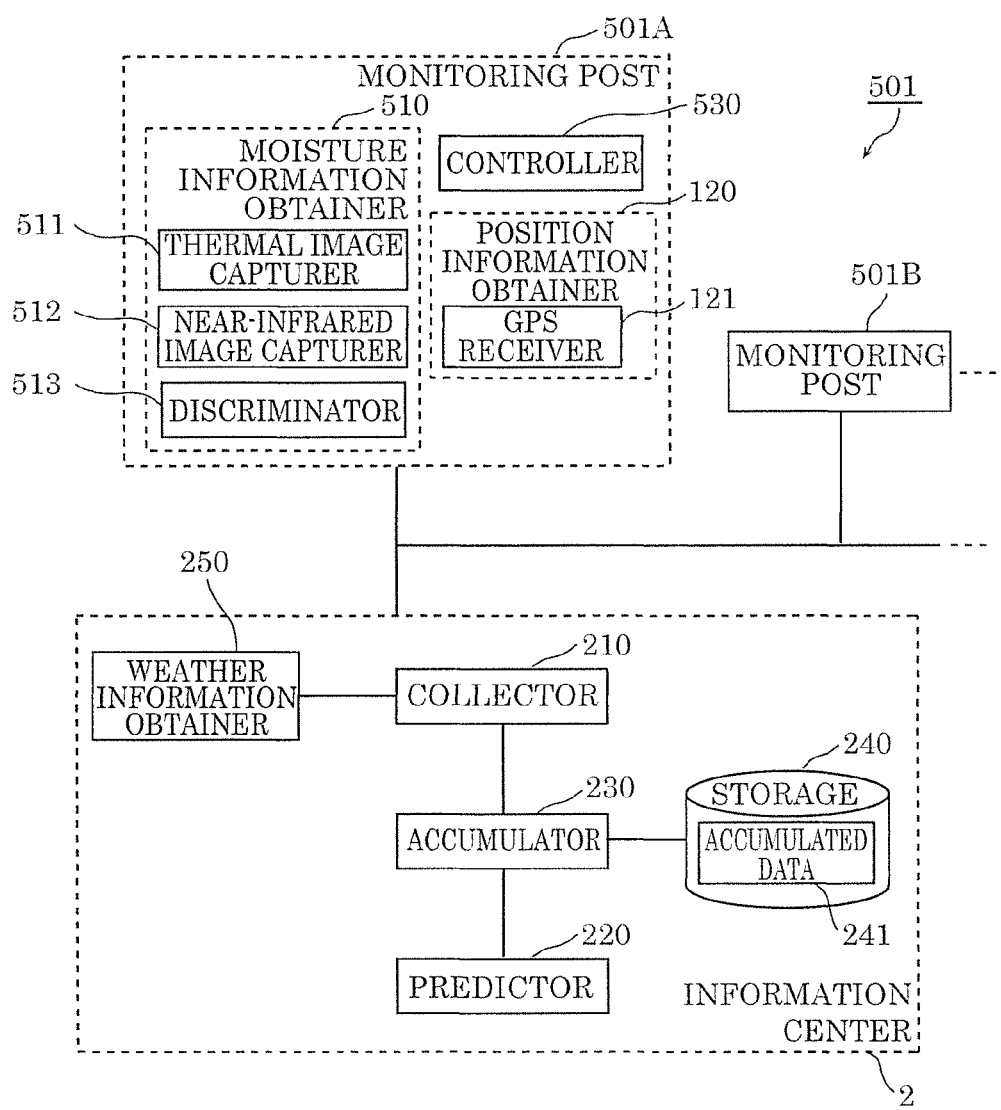
FIG. 19 is a block diagram illustrating a configuration of the road surface condition prediction system according to Embodiment 6.

FIG. 19 is a block diagram illustrating a configuration of road surface condition prediction system 501 according to the present embodiment. As illustrated in FIG. 19, monitoring post 501A includes moisture information obtainer 510, position information obtainer 120, and controller 530. Monitoring post 501A and monitoring post 501B have the same configuration. For this reason, the configuration of monitoring post 501A will be described below.

Controller 530 is implemented with a non-volatile memory which stores programs, a volatile memory which is a transient memory region for executing programs, an input/output port, and a processor which executes the programs. Controller 530 controls the operations of moisture information obtainer 510 and position information obtainer 120.

Moisture information obtainer 510 obtains moisture information on moisture on a road surface by detecting the moisture on the road surface of the road near monitoring post 501A. As illustrated in FIG. 19, moisture information obtainer 510 includes thermal image capturer 511, near-infrared image capturer 512, and discriminator 513.

Thermal image capturer 511 includes a far-infrared light sensor array of thermopiles or bolometers, and captures the radiation energy from the road surface as the temperature distribution. Thermal image capturer 511 generates a thermal image which indicates the temperature distribution within the region for image capture.

Near-infrared image capturer 512 is an image sensor composed of a semiconductor material such as InGaAs or PbS and having sensitivity to light in the near-infrared region, i.e., light having a wavelength in the range of about 0.7 μm to 2.4 μm, for example. Near-infrared image capturer 512 includes multiple light receiving regions arranged into a matrix. Near-infrared image capturer 512 obtains a target image generated based on light having a wavelength which is the absorption wavelength by water, and a reference image generated based on light having a wavelength which is not the absorption wavelength by water.

Near-infrared image capturer 512 includes multiple wavelength filters (not illustrated) whose switching is controlled by controller 530. Near-infrared image capturer 512 receives light which passes through one of the multiple wavelength filters. A first filter, which is one of the multiple wavelength filters, is a bandpass filter through which light having a wavelength near the light absorption peak of water transmits. A second filter, which is one of the multiple wavelength filters, is a bandpass filter through which light having a wavelength other than the wavelength having the light absorption peak of water transmits.

The light passing through the first filter is photoelectrically converted by the multiple light receiving regions to obtain an image (target image) at the absorption wavelength by water. The light passing through the second filter is photoelectrically converted by the multiple light receiving regions to obtain an image (reference image) at the wavelength other than the wavelength having the light absorption peak of water.

Discriminator 513 discriminates that the detected moisture has which state, i.e., water, ice, snow, or a mixed state thereof. Specifically, based on the two images obtained by near-infrared image capturer 512 and the thermal image obtained by thermal image capturer 511, discriminator 513 discriminates the state of the moisture on the road surface, i.e., dryness, water, ice, snow, or a mixed state of two or more thereof, thereby generating the state information.

Discriminator 513 also discriminates a degree of spread of water, ice, snow, or a mixed state thereof on the road surface. The degree of spread is represented by the area thereof.

Discriminator 513 is implemented with a non-volatile memory which stores programs, a volatile memory which is a transient memory region for executing programs, an input/output port, and a processor which executes the programs. Discriminator 513 may be implemented with the same hardware resource as that of controller 530.

Discriminator 513 obtains the two-dimensional distribution of water by comparing the luminance value of the target image to that of the reference image. Specifically, discriminator 513 compares the target image to the reference image by comparing the luminance value of each pixel (light receiving region) in the target image to that in the reference image. Discriminator 513 determines that a pixel having a large difference between the luminance value of the reference image and the luminance value of the target image is the pixel indicating the moisture detected. The distribution image of the moisture is obtained by performing this comparison processing on all the pixels.

Discriminator 513 also obtains the distribution of snow by comparing the luminance value of the reference image to a predetermined threshold. Specifically, discriminator 513 discriminates a pixel in the reference image having a luminance value larger than the predetermined threshold as the pixel indicating detection of snow. The distribution image of snow is obtained by performing this determination processing on all the pixels.

Furthermore, discriminator 513 determines based on a combination of the thermal image and the distribution image of the moisture whether each pixel indicates water or ice. Specifically, discriminator 513 determines whether a temperature is 0° C. or higher or not in the pixels of the thermal image corresponding to all the pixels determined based on the distribution image of the moisture that the moisture is present. When the temperature is 0° C. or higher, the pixel indicates water. When the temperature is less than 0° C., the pixel indicates ice. Thereby, the distribution image of water and the distribution image of ice are obtained.

Based on the distribution image of water, ice, and snow, discriminator 513 calculates the proportions of the areas of water, ice, and snow within the area for measurement, which is a region for image capturing. Based on the calculated proportions, discriminator 513 generates the state information indicating the moisture condition within the area for measurement. For example, discriminator 513 determines that the state having the largest proportion is the moisture condition of the area for measurement.

Although not illustrated, monitoring post 501A includes a communicator which wirelessly or wiredly communicates with information center 2. The state information and the like together with the position information are transmitted to information center 2 via the communicator.

Here, moisture information obtainer 510 may use the temperature information obtained by a temperature sensor installed on the road and composed of a thermistor or a thermocouple, rather than thermal image capturer 511. Use of thermal image capturer 511 can reduce the cost for installation of the temperature sensor, resulting in measurement of the temperature distribution with high optical resolution. Use of the temperature sensor installed on the road enables more precise measurement of the temperature on the road. These may be used in combination. The temperature measured by thermal image capturer 511 is corrected using the temperature obtained from the temperature sensor installed on the road, thereby enabling precise measurement of temperature distribution with high optical resolution.

The luminance value of an image at the absorption wavelength by water when water is not present may be preliminarily stored. Thereby, the moisture amount can be measured in a configuration not including a light source having a wavelength other than the absorption wavelength by water. For this reason, the cost can be reduced. In the case where the temperature information of water is not needed, moisture information obtainer 510 does not need to include thermal image capturer 511, and does not need to obtain the information from the temperature sensor such as a thermistor or a thermocouple.

Near-infrared image capturer 512 may include a near-infrared light source of an LED or a laser, and a near-infrared light receiver made of InGaAs or PbS. Thereby, the average ambient moisture amount can be measured, reducing cost.

For example, the direction of irradiation of the light from the near-infrared light source may be varied. While the region irradiated with light is being varied, the reflected light may be received by the light receiver. A near-infrared image can be generated like a camera by measuring a change in light quantity.

Monitoring post 501A is installed so as to measure the specific position for stationary measurement. For this reason, the position information indicating the installation position may be registered in advance in storage 240 of information center 2 when monitoring post 501A is installed. Thereby, monitoring post 501A does not need to include position information obtainer 120. In the case where monitoring post 501A includes position information obtainer 120, the time and effort to register the position information for every installation of the monitoring post can be reduced.

In information center 2, weather information obtainer 250 obtains the weather information of the position corresponding to the position information transmitted from monitoring post 501A. Usually, the position for weather observation is different from the position at which monitoring post 501A is located. For this reason, weather information obtainer 250 obtains the weather information of the position closest to the installation position of monitoring post 501A, for example.

Monitoring post 501A may include environmental information obtainer 130 illustrated in FIG. 4. Environmental information obtainer 130 may be implemented with a temperature sensor, an illuminance sensor, a humidity sensor, an atmospheric pressure sensor, a rainfall sensor, or a wind speed sensor, for example. Environmental information obtainer 130 obtains the environmental information such as temperature, illuminance of sunlight, humidity, atmospheric pressure, rainfall, and wind speed.

Monitoring post 501A including environmental information obtainer 130 can obtain more detailed environmental information for each location on the road surface, compared to the weather information. Thereby, a change in the moisture condition of the road surface in each location can be more precisely predicted.

Here, the data structure of accumulated data 241 stored in storage 240 of information center 2 will be described with reference to FIGS. 20 and 21.

FIG. 20 is a table illustrating one example of accumulated data 241 at four positions at a specific time. The accumulated data includes the date and time information, the position information, the moisture condition of the road surface within the area for measurement as the moisture information, and the proportions of the dryness region, the water region, the snow region, and the ice region within the area for measurement. The moisture condition of the road surface indicates the state of the region having the largest proportion within the area for measurement.

Furthermore, accumulated data 241 includes the weather information, i.e., weather, air temperature, rainfall, snowfall, wind direction, sunshine duration, humidity, and atmospheric pressure information. The weather information illustrated in FIG. 20 is one example, and may include data such as dew point temperature, vapor pressure, cloud cover, and global solar radiation other than the information listed above.

FIG. 21 is a table illustrating one example of accumulated data 241 obtained every one hour at a specific position. Although the road surface condition, the proportions of the dryness region, the water region, the snow region, and the ice region within the area for measurement, and the weather information obtained every one hour are accumulated in FIG. 21, the data can be accumulated at any interval. The data may be accumulated at every predetermined time, such as every 30 minutes or every two hours.

The data does not always need to be updated at an equal interval. For example, the frequency of the update may be increased in the case where it is predicted that the moisture condition will significantly change, such as cases of a large amount of rainfall, snowfall, or solar radiation. For example, the case where it is predicted that the moisture condition will significantly change includes the case where the moisture is present on the road surface, the moisture temperature in the latest measurement is 0° C. or less, and the ambient air temperature is increasing, and the case where the moisture is present on the road surface, the moisture temperature in the latest measurement is 0° C. or higher, and the ambient air temperature is decreasing. Thereby, the moisture condition of the road surface can be predicted with high precision from a smaller amount of information. Thereby, cost of transmission and accumulation of the information can be reduced.

Monitoring post 501A does not need to be a dedicated device which detects the moisture. For example, monitoring post 501A may include a light source which can be used as a street light or a traffic light, such as an LED, an organic electroluminescent (EL) element, or an inorganic EL element. A monitoring post having multiple functions can reduce cost of installation and cost of members such as wiring.

In the case where monitoring post 501A includes a light source which functions as a street light or a traffic light, such a light source may be operated synchronizing with the near-infrared light source for obtaining the moisture information or near-infrared image capturer 512. For example, the road surface can be alternately irradiated with the light source for obtaining the moisture information and the light source for a street light or a traffic light to capture an image, thereby obtaining highly precise moisture information.

Monitoring post 501A may include a means for measuring the position of a moving object such as a person or a vehicle. Monitoring post 501A may include a means for obtaining an image, such as a near-infrared imaging device, as the means for measuring the position of the moving object. The moving body can be measured by comparing the obtained image and other images between frames by a background differencing technique. Alternatively, the moving object may be measured using a millimeter-wave radar.

A necessity for monitoring the surroundings of monitoring post 501A may be determined. It can be determined that a location where a moving object frequently passes in the surrounding area of monitoring post 501A is an area having a high necessity to monitor the moisture condition of the road surface. In contrast, it is considered that a location where any moving object has never passed so far or a location where the moving object barely passes is an area having a low necessity to monitor the road surface condition. The monitoring area which requires monitoring of the surroundings of monitoring post 501A may be discriminated from the area without such monitoring, the moisture condition of the road surface may be discriminated only in the monitoring area, and the state information indicating the result of discrimination may be transmitted to information center 2. Thereby, the amount of processing needed for the discrimination and the amount of information to be transmitted can be reduced. State information indicating a moisture condition more highly discriminated can be obtained, compared to the case where the state information indicating the average moisture condition of the surroundings of monitoring post 501A is transmitted to information center 2.

Monitoring post 501A may discriminate the type of the moving object from the moving velocity and size of the moving object. Thereby, a vehicle can be discriminated from a person, and the moisture condition of the road can be distinguished from the moisture condition of a sidewalk.

Monitoring post 501A may include moisture information obtainer 110 of a spot type illustrated in Embodiment 2.

Figure 22:
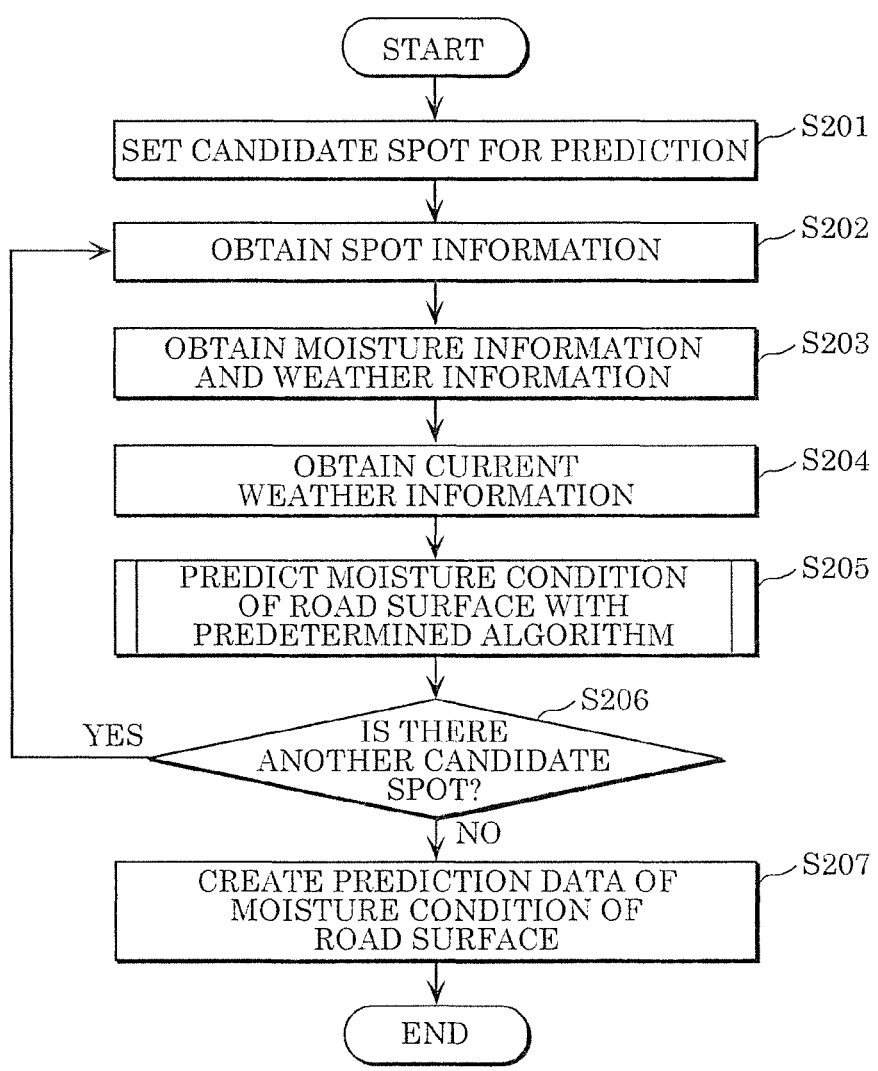
FIG. 22 is a flowchart illustrating a first operation of the road surface condition prediction system according to Embodiment 6.

The operation of road surface condition prediction system 501 according to the present embodiment will now be described. FIG. 22 is a flowchart illustrating a first operation of road surface condition prediction system 501 according to the present embodiment. FIG. 22 illustrates first processing to predict the moisture condition of the road surface.

First, one or more candidate spots to be predicted are set in step S201. A candidate spot is represented by a combination of a latitude and a longitude. For example, predictor 220 displays an input screen or a selection screen for candidate spots on a display, and receives the selection from the user. The candidates for selection to be displayed on the selection screen are, for example, the positions indicated by all the pieces of position information included in accumulated data 241.

In step S202, predictor 220 then selects one candidate spot from the one or more candidate spots set in step S201, and obtains the latitude and longitude of the selected candidate spot. The candidate spot selected in step S202 is the target position for prediction.

In step S203, predictor 220 then obtains the state information indicating the moisture condition of the road surface at the target position and the weather information from storage 240.

In step S204, weather information obtainer 250 then obtains the current weather information at the target position.

In step S205, predictor 220 then predicts the moisture condition of the road surface at the target position by executing a predetermined algorithm. The details of step S205 are as described with reference to FIG. 10.

In step S206, predictor 220 determines whether there is another candidate spot not subjected to the prediction or not among the one or more candidate spots for prediction set in step S201. When there is a candidate spot not subjected to the prediction (Yes), the processing returns to step S202 to repeat the processing described above.

When any candidate spot not subjected to the prediction is not present in step S206 (No), predictor 220 creates prediction data summarizing the result of prediction for each spot in step S207.

Figure 23:
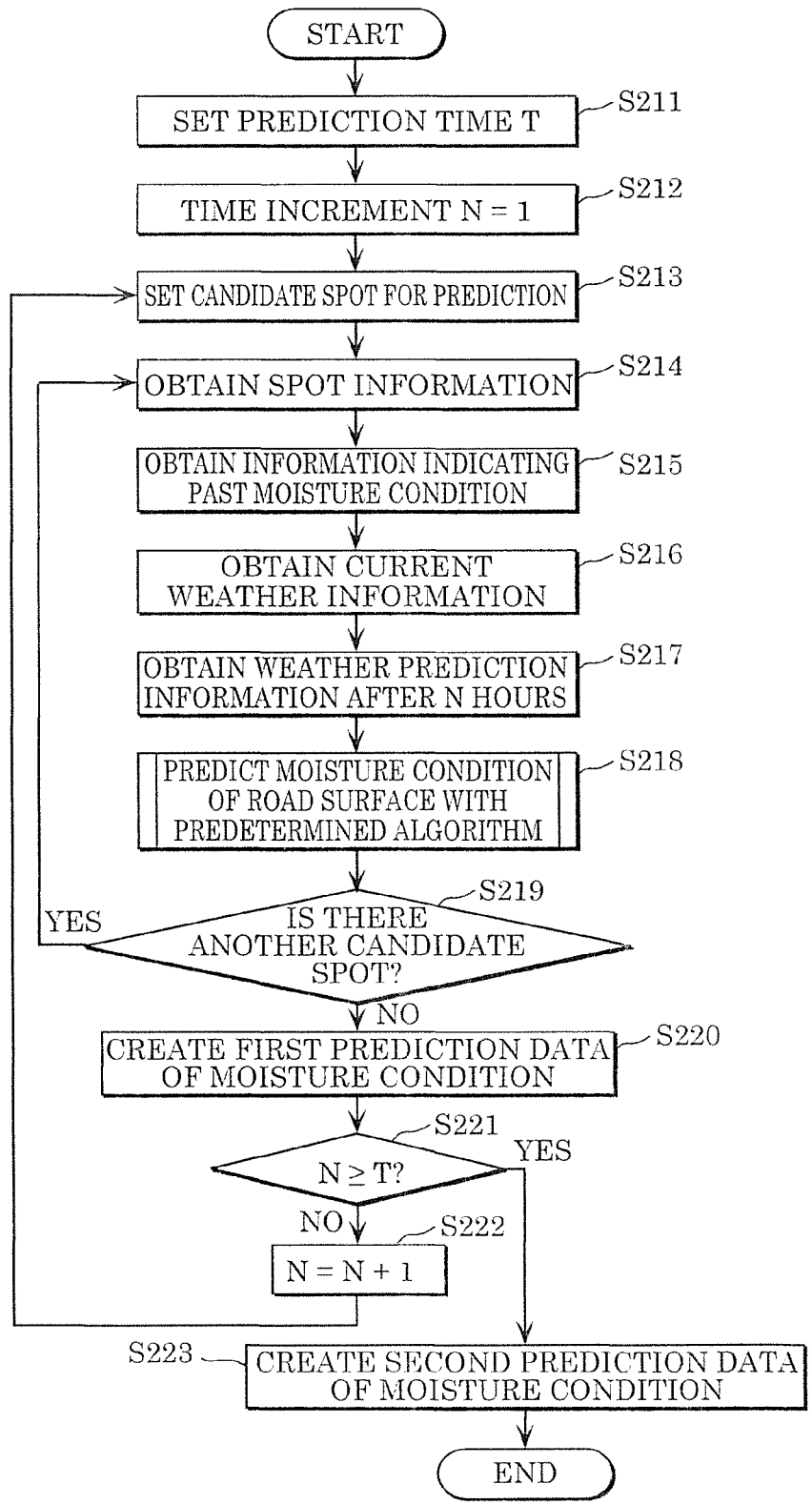
FIG. 23 is a flowchart illustrating a second operation of the road surface condition prediction system according to Embodiment 6.

Second processing to predict the moisture condition of the road surface will now be described with reference to FIG. 23. FIG. 23 is a flowchart illustrating a second operation of road surface condition prediction system 501 according to the present embodiment. Road surface condition prediction system 501 may execute any one of the first operation illustrated in FIG. 22 and the second operation illustrated in FIG. 23.

First, predictor 220 sets prediction time T in step S211. Prediction time T is a range of time where the prediction is performed. Specifically, prediction time T is a time indicating how many hours ahead of the current time the prediction is intended to be performed.

In step S212, predictor 220 then sets time increment N to 1. Time increment N indicates the time interval for prediction. In other words, the prediction information of the moisture condition every N hours is generated. By setting N=1, the prediction information of the moisture condition after one hour from the current time is generated.

In step S213, predictor 220 then sets one or more candidate spots to be predicted.

In step S214, predictor 220 then selects one candidate spot from the one or more candidate spots set in step S213, and obtains the latitude and longitude of the selected candidate spot.

In step S215, predictor 220 then obtains the state information indicating the moisture condition of the road surface at the target position, and the weather information from storage 240.

In step S216, weather information obtainer 250 then obtains the current weather information at the target position.

Furthermore, in step S217, weather information obtainer 250 obtains the weather prediction information after N hours. The weather prediction information is a so-called weather forecast.

Thereafter, in step S218, predictor 220 predicts the moisture condition of the road surface at the target position after N hours by executing a predetermined algorithm. The details of step S218 are as described with reference to FIG. 10.

In step S219, predictor 220 determines whether there is another candidate spot not subjected to the prediction or not among the one or more candidate spots for prediction set in step S211. When there is any candidate spot not subjected to the prediction (Yes), the processing returns to step S213 to repeat the processing described above.

When any candidate spot not subjected to the prediction is not present in step S219 (No), first prediction data summarizing the result of prediction for each spot is created in step S220. The first prediction data is, for example, map information indicating the moisture condition of the road surface at a predetermined time (for example, after one hour).

In step S221, predictor 220 compares time increment N to prediction time T. When N≥T (Yes), in step S223, predictor 220 creates second prediction data, which summarizes pieces of first prediction data after one hour, two hours, . . . , and T hours. The second prediction data indicates a temporal change in the first prediction data, specifically, a temporal change in the prediction map of the moisture condition.

In contrast, when the relation represented by N≥T is not satisfied in step S221 (No), the value of N is increased only by 1 in step S222, the processing returns to step S213 to continue the prediction processing. At this time, in step S218, the moisture condition of the road surface after N hours is also predicted based on the result of prediction after (N−1) hours in addition to the state information indicating the moisture condition of the road surface in the past obtained in step S215, the current weather information obtained in step S216, and the weather prediction information after N hours obtained in step S217.

The second prediction method illustrated in FIG. 23 enables the prediction of the moisture condition of the road surface with high precision based on the weather information in the past and the weather prediction in the future.

Figure 24:
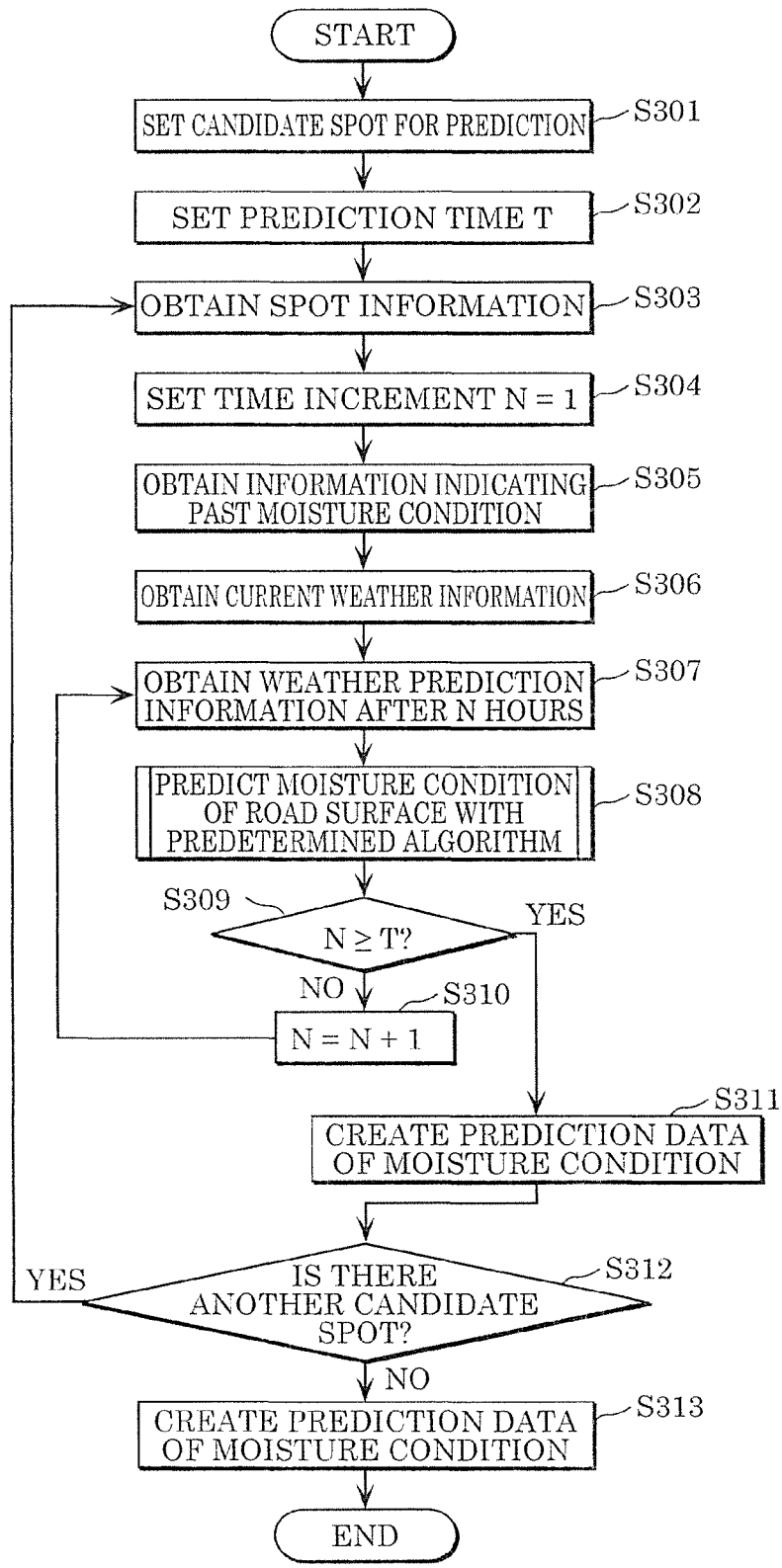
FIG. 24 is a flowchart illustrating a third operation of the road surface condition prediction system according to Embodiment 6.

Third processing to predict the moisture condition of the road surface will now be described with reference to FIG. 24. FIG. 24 is a flowchart illustrating a third operation of road surface condition prediction system 501 according to the present embodiment.

First, in step S301, predictor 220 sets one or more candidate spots to be predicted.

In step S302, predictor 220 then sets prediction time T.

In step S303, predictor 220 then selects one candidate spot from the one or more candidate spots set in step S301, and obtains the latitude and longitude of the selected candidate spot.

In step S304, predictor 220 then sets time increment N to 1.

In step S305, predictor 220 then obtains the state information indicating the moisture condition of the road surface at the target position, and the weather information from storage 240.

In step S306, weather information obtainer 250 then obtains the current weather information at the target position.

In step S307, weather information obtainer 250 then obtains the weather prediction information after N hours.

In step S308, predictor 220 then predicts the moisture condition of the road surface at the target position after N hours by executing a predetermined algorithm.

In step S309, predictor 220 compares time increment N to prediction time T. When N≥T (Yes), in step S311, predictor 220 creates first prediction data, which summarizes the results of prediction after one hour, two hours, . . . , and T hours. The first prediction data is the information indicating a temporal change in the moisture condition of the road surface at a predetermined position.

When the relation represented by N≥T is not satisfied in step S309 (No), predictor 220 increases the value of N only by 1 in step S310. The processing returns to step S307 to continue the prediction processing.

In step S312, predictor 220 determines whether there is another candidate spot not subjected to the prediction or not among the one or more candidate spots set in step S301. When there is any candidate spot not subjected to the prediction (Yes), the processing returns to step S303 to repeat the processing described above.

When any candidate spot not subjected to the prediction is not present in step S312 (No), second prediction data summarizing first prediction data created in step S311 is created in step S313. The second prediction data is, for example, data of the first prediction data represented on a map, the first prediction data representing a temporal change in the result of prediction for each spot.

At this time, predictor 220 also predicts the moisture condition after N hours based on the result of prediction after (N−1) hours in step S308 in addition to the state information indicating the moisture condition of the road surface in the past obtained in step S305, the current weather information obtained in step S306, and the weather prediction information after N hours obtained in step S307. The third operation illustrated in FIG. 24 enables the prediction of the moisture condition with high precision based on the weather information in the past and the weather prediction in the future.

Figure 25:
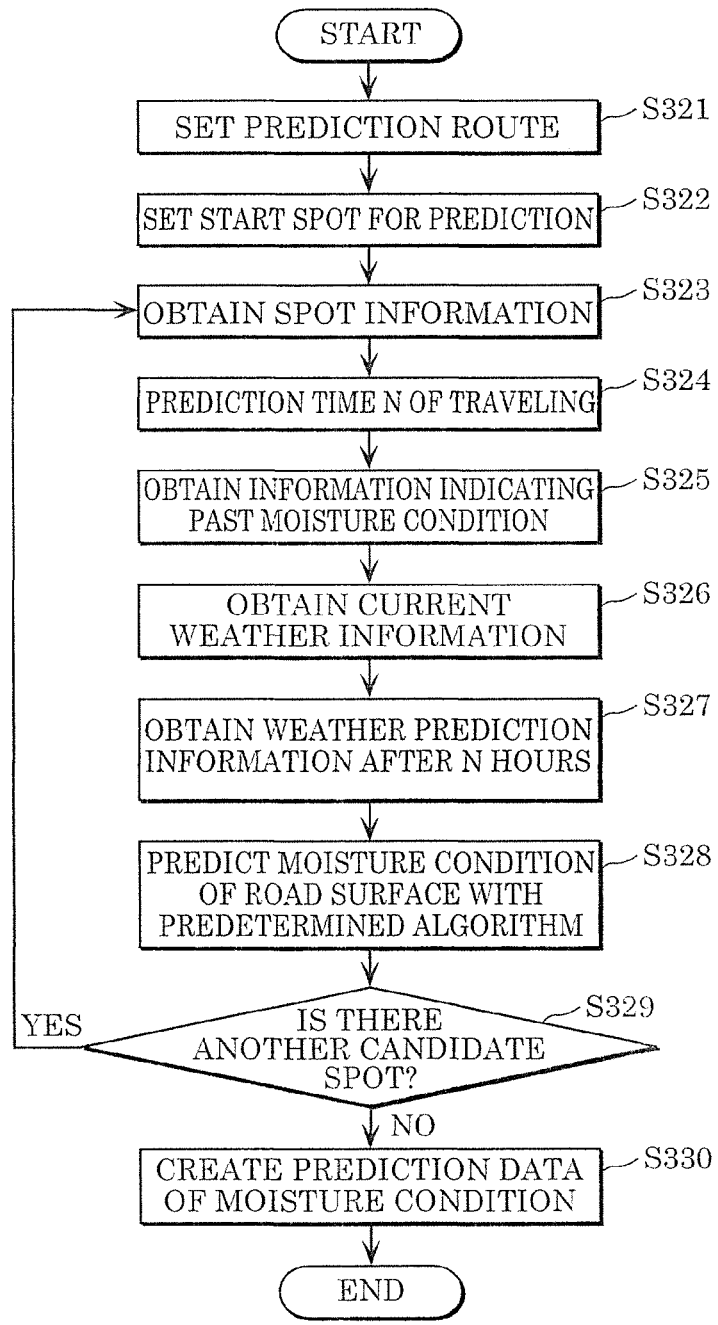
FIG. 25 is a flowchart illustrating a fourth operation of the road surface condition prediction system according to Embodiment 6.

Fourth processing to predict the moisture condition of the road surface will now be described with reference to FIG. 25. FIG. 25 is a flowchart illustrating a fourth operation of road surface condition prediction system 501 according to the present embodiment.

First, in step S321, predictor 220 sets a prediction route. The prediction route is set as combinations of one or more candidate spots for prediction included in the route from the start point to the end point of the travel with the corresponding travel times N from the start point of the travel to the one or more candidate spots for prediction. A candidate spot for prediction is represented by a latitude and a longitude. The travel time N is influenced by the moving velocity or the traffic situations of the roads, and is different between the one or more candidate spots for prediction.

In step S322, predictor 220 then sets a start spot for prediction.

In step S323, as the target position, predictor 220 then obtains the information indicating the latitude and longitude of the start spot for prediction set in step S322.

In step S324, predictor 220 then sets the prediction time of traveling to N.

In step S325, predictor 220 then obtains the state information indicating the moisture condition of the road surface at the target position, and the weather information from storage 240.

In step S326, weather information obtainer 250 then obtains the current weather information at the target position.

In step S327, weather information obtainer 250 then obtains the weather prediction information after N hours.

In step S328, predictor 220 then predicts the moisture condition of the road surface after N hours at the target position by executing a predetermined algorithm.

In step S329, predictor 220 determines whether there is any candidate spot not subjected to the prediction or not among the one or more candidate spots for prediction included in the prediction route set in step S321. When there is any candidate spot not subjected to the prediction (Yes), the processing returns to step S323 to repeat the processing described above.

When any candidate spot not subjected to the prediction is not present in step S329 (No), in step S330, predictor 220 creates the prediction data of the moisture condition of the road surface, which is a summary of the result of prediction for each spot.

At this time, in step S328, predictor 220 also predicts the moisture condition after N hours based on the result of prediction after (N−1) hours in addition to the state information indicating the moisture condition of the road surface in the past obtained in step S325, the current weather information obtained in step S326, and the weather prediction information after N hours obtained in step S327.

The fourth operation illustrated in FIG. 25 can highly precisely predict the state of the road surface of the prediction route from the start point to the end point of the travel, based on the weather information in the past and the weather prediction in the future.

Others

The road surface condition prediction system, the driving assistance system, the road surface condition prediction method, and the data distribution method according to one or more aspects to this disclosure have been described based on the embodiments above, these embodiments should not be construed as limitative to this disclosure. A variety of modifications of the embodiments conceived by persons skilled in the art, and those composed of combinations of components in different embodiments may also be included in the scope of one or more aspects of this disclosure without departing the gist of this disclosure. Moreover, the road surface condition prediction method described above in this specification enables the prediction of the road surface condition with high precision. For this reason, obtaining the moisture information and predicting the road surface condition do not need to be performed in an integral device.

For example, predictor 220 may perform the prediction for each travel route of the moving body based on the pieces of moisture information collected from moving bodies 1A and 1B, and summarize the results of prediction as a series of information. By summarizing the result of prediction for each travel route, the prediction of the moisture condition of the road surface on the travel route can be seen at a glance. Accordingly, such prediction can be efficiently used in assistance of driving such as allowance of automated driving.

Moreover, by collecting the pieces of moisture information from moving bodies 1A and 1B, a large number of results of detection of the moisture condition can be collected in a short period of time in a wide region. Thereby, the result of prediction of the moisture condition in a wider region can be created with high precision and used.

For example, in the case where moving bodies 1A and 1B travel on the same road at different times, information related with a change rate of the moisture condition for each position of the road may be learned based on the moisture information measured on the same road at different times. Thereby, the moisture condition of the road surface can be more precisely predicted. For example, the moisture temperature at the same location is measured several times. From the temporal change rate of the moisture temperature, the changeability of the temperature of the road can be determined.

In this case, not only the moisture temperature is measured several times, but also the illuminance of sunlight or the air temperature may be measured. Thereby, the moisture condition can be predicted in consideration of the illuminance of sunlight or the air temperature and the position. The illuminance of sunlight or the air temperature is obtained, for example, by environmental information obtainer 130 mounted on moving bodies 1A and 1B. Alternatively, the illuminance of sunlight or the air temperature may be inferred from the result of remote sensing of the earth from a satellite or the weather information. Alternatively, the information of the illuminance of sunlight may be learned at each position of the road for each date and time and each weather. For example, the time zone in which the position of the road is in the shade and the time zone in which the position of the road is under the sun are different for each position of the road. Accordingly, the moisture condition can be more precisely predicted.

The reflectance of sunlight is also varied according to the moisture condition (specifically, snow, ice, or water). For this reason, a database of absorption of sunlight for each moisture condition may be accumulated in storage 240 of information center 2, for example. Such a database can increase the precision in prediction of an increasing rate of the moisture temperature by sunlight, resulting in high precision prediction of the moisture condition.

For example, the moisture amount of the same road may be measured several times at different times of day, the changeability of the moisture amount may be learned from its increase or decrease, and the changeability may be stored in storage 240 of information center 2. By learning in combination with the information such as the snowfall, the rainfall, the illuminance of sunlight, the air temperature, or the wind speed during the measurement several times, the change rate of the moisture amount can be corrected with the parameters above. Thereby, the moisture amount can be more precisely predicted.

Moving body 1A may include a memory which stores the moisture information in association with the time information, and a memory which stores the position information in association with the time information. In moving body 1A, controller 170 may process the data to connect the position information to the moisture information based on the time information during a halt of driving or the end of travel, for example. For example, in the case where a means for obtaining the position information and the time information is mounted on moving body 1A in advance, addition of only moisture information obtainer 110 enables utilization of the existing means for obtaining the position information. Thereby, the cost of road surface condition prediction system 1 can be reduced.

To grasp the changeability of the temperature of each road, the moisture information may be obtained two or more times at least within 24 hours, preferably within 6 hours.

Moving body 1A may include a means for carrying luggage, such as a luggage carrier. For example, moving body 1A may be a vehicle operated or managed by transportation business operators or mail business operators. Such a configuration enables not only obtaining of the moisture information but also performing of transportation business or mail business, reducing the cost in obtaining the moisture information. Such a configuration can also improve a regional coverage of the position for obtaining the moisture information, and can increase the number of repetitions in detection of the moisture at a single spot.

Moving body 1A and moving body 1B may have different weights. The difference in weight between moving body 1A and moving body 1B results in a difference in a force of pressurized by tires or a difference in vibration applied to the road. Thereby, the vibration of the surface condition of the road surface or a change in surface irregularities can be varied. Thereby, the moisture condition with a larger variety can be measured.

For example, in the case of a moving body having a light weight, the pressure applied by the tires is smaller and thus the vibration is smaller. In contrast, in the case of a moving body having a large weight, the pressure applied by the tires is larger and thus the vibration is larger. The amount of applied pressure suitable for the measurement is varied according to the hardness of the road surface. For this reason, by measuring the moisture condition on the same road by moving bodies 1A and 1B having different weights, several states having different hardnesses such as accumulated snow, compacted snow, mud, and freezing can be precisely predicted.

Moving body 1A and moving body 1B may be vehicles having different heights. A difference in vehicle height can vary the installation heights of near-infrared light source 111 and light detector 112 in moisture information obtainer 110 from the road surface. The moisture information from a lower view of a vehicle having a smaller height is moisture information in a narrow region while the moisture information from a higher view of a vehicle having a larger height is moisture information in a wider region. For this reason, a road surface condition prediction system including several vehicles having different heights as the multiple moving bodies can obtain both of the average moisture information of the entire road surface and a variation in moisture information in each part thereof. Thereby, the moisture condition of the road surface can be more precisely predicted.

Moving body 1A or 1B may be a flying body called a drone. Thereby, the moisture information in a wide region can be obtained from the sky at low cost. In the case of the flying body such as a drone, "traveling on the road" means that the flying body moves along the road in the sky above the road.

Although an example in which the moisture on the road surface is directly detected has been described above, a method of estimating the moisture on the road surface can be used through detection of the moisture on the tire surface in the case where moving body 1A is a vehicle. Since the tire surface has a fixed color and light scattering coefficient, the moisture condition can be more highly precisely discriminated by a method of measuring the tire surface, compared to the measurement of road surfaces having different colors or surface irregularities according to nations or regions.

Moving body 1A may include a means for measuring the position of a person or a vehicle, the means including a near-infrared imaging device. Moving body 1A may determine the necessity of monitoring the surroundings of moving body 1A.

Moving body 1A may discriminate the type of the moving object according to the moving velocity and size of the moving object. Thereby, a vehicle can be discriminated from a person, and the moisture condition of the road can be distinguished from the moisture condition of a sidewalk.

The position information obtained in moving body 1A may be stored in association with the reflectance at the absorption wavelength by water in information center 2 or moving body 1A. Thereby, the reflectance at the absorption wavelength by water in the case where water is not present and the reflectance at the absorption wavelength in the case where water is present can be learned. Thereby, the moisture amount can also be measured in a configuration not including a light source having a wavelength other than the absorption wavelength by water and a light detector.

Moving body 1A may include a function to detect oil leakage on the road surface. For example, such a configuration can obtain and provide information indicating a road surface condition more important to two-wheeled vehicles, which readily fall down due to slip on oil. For detection of oil, for example, moving body 1A may have a configuration including an infrared light source at a wavelength of 3.4 µm or a configuration including an infrared light source at a wavelength of 6.9 µm, for example. Alternatively, moving body 1A may have a configuration including an infrared light source in a broadband to vary the wavelength for measurement using a filter through which only light having a specific wavelength transmits. The filter may be disposed between the light source and the target object for measurement, or may be disposed between the target object for measurement and the light receiver.

The moisture condition may include not only dryness, water, ice, and snow, but also states such as icy surfaces, black ice, muddy snow, and half-melt snow.

Road surface material information may be used in the prediction of the moisture condition. For example, the change rate of the moisture condition is varied according to the material such as asphalt, concrete, iron plates, gravels, and dirt. The material information may be stored in advance in association with the position information. Alternatively, moving body 1A may include a visible camera, and may determine the material for the road based on the captured image.

Moving body 1A or 1B may be a mail motorcycle for delivering small mails which can be put into mailboxes of houses. Thereby, the information indicating the moisture condition of the road surface early in the morning can be obtained, because such information, which is usually obtained by only by the large vehicles of delivery services which start delivery after the user gets up, tends to be scanty early in the morning.

For example, predictor 220 may predict the moisture condition of a second road surface different from a first road surface based on the moisture information of the first road surface. Specifically, predictor 220 performs the prediction based on the correlation between the first road surface and the second road surface. The correlation indicates the relation between the moisture condition of the first road surface and the moisture condition of the second road surface. Predictor 220 performs the prediction using a correlation value in the range of 0 to 1 according to the degree of the correlation, for example.

For example, in the case where the first road surface and the second road surface are a first lane and the second lane on the same road, the moisture condition of the first road surface tends to be the same as the moisture condition of the second road surface. For example, in the case where the first road surface is inclined and the second road surface is located at the bottom of the first road surface, the moisture amount on the second road surface is likely to be always larger than that on the first road surface. As in these cases, multiple road surfaces have a correlation in some cases. Accordingly, predictor 220 can predict the moisture condition of the first road surface based on the moisture information of the first road surface, and can correct the predicted moisture condition with a correlation value to output the result of prediction of the moisture condition of the second road surface.

Alternatively, the moisture condition of the first road surface may be associated with the moisture condition of the second road surface by machine learning. Machine learning can use a method such as random forest or deep learning.

In the case where moving body 1A is a vehicle traveling on road 3, moisture information obtainer 110 (specifically, near-infrared light source 111 and light detector 112) may be disposed on two lateral surfaces of the vehicle. By detecting the areas of the lateral sides of the vehicle, the moisture of the road surface can be detected not only in the lane where the vehicle is traveling, but also in the opposite lane or another type of lane such as a sidewalk. At this time, multiple moisture information obtainers 110 may be disposed on one of the lateral surfaces. Thereby, the moisture of the road surface can be detected not only in its adjacent lane but also a remote lane.

Moisture information obtainer 110 may detect the moisture in the detection area in the backward direction of the vehicle. Thereby, influences of headlamps of oncoming vehicles can be reduced.

Moisture information obtainer 110 may be disposed in the left and right portions of the front portion of the vehicle. Thereby, dirt or the like adhering to the surface of the vehicle due to the wind received during traveling can be easily removed.

To reduce the angle of incidence of light used for irradiation of the road surface, moisture information obtainer 110 may be disposed on the roof of the vehicle. The angle of incidence may be less than 50 degrees, for example. Thereby, even black ice can be detected.

Alternatively, considering bad weather, moisture information obtainer 110 may be disposed at a lower position of the vehicle, such as the bottom thereof (namely, a position near the road surface). Thereby, detection by mistake of the moisture in the air such as rain or fog can be prevented.

For example, moisture information obtainer 110 may be disposed on the rear side of the vehicle. Thereby, influences by solar radiation and dirt caused by human hands can be prevented. Moisture information obtainer 110 can be detachably mounted on the vehicle with ease.

In the case where moisture information obtainer 110 includes near-infrared image capturer 512 rather than light detector 112, sensors having different numbers of pixels may be disposed according to the installation position in the vehicle. For example, the number of pixels in a sensor mounted on the lateral surfaces of the vehicle is larger than the number pixels in a sensor mounted on the front surface of the vehicle. Thereby, the moisture of the road surface can be precisely detected in multiple lanes. Conversely, the number of pixels in the sensor mounted on the front surface of the vehicle may be larger than the number of pixels in the sensor mounted on the lateral surfaces of the vehicle. Thereby, the safety of the vehicle itself can be enhanced.

In the case where the moisture of the road surface is detected in multiple lanes, the type of lane may be discriminated. Specifically, the lane on the road surface detected can be discriminated based on the position of the vehicle and the number of lanes of the road. For example, in the case where the vehicle is traveling on a road having one lane on the one side, i.e., two lanes in total, it can be determined that the right side of the vehicle is the opposite lane and the left side thereof is a sidewalk. Alternatively, the type of lane can be discriminated based on an image captured by a visible camera mounted on the vehicle, for example. The type of lane may be accumulated in association with the state information such as dryness, water, ice, or snow.

For example, the slip ratio of the tire may be measured. The precision in detection of the moisture condition can be enhanced by measuring the slip ratio of the tire.

For example, the weather information may include pollen information. For example, the presence of accumulated snow or raining reduces the amount of pollen. The scattering of the pollen captured by the moisture on the road surface is again facilitated after the moisture evaporates and the road surface gets dry. Thus, the precision in prediction of the moisture condition of the road surface can be enhanced by using the pollen information.

For example, in the embodiments above, each of the components may be composed of dedicated hardware, or may be implemented by executing a software program suitable for the component. Each of the components may be implemented by a program executer, such as a CPU or a processor, which reads and performs a software program recorded in a recording medium such as a hard disk or a semiconductor memory.

Besides, a variety of modifications of the embodiments conceived and made by persons skilled in the art, and embodiments implemented with any combinations of the components and functions of the embodiments without departing from the gist of this disclosure are also included in this disclosure.

INDUSTRIAL APPLICABILITY

The road surface condition prediction system, the driving assistance system, the road surface condition prediction method, and the data distribution method according to this disclosure are useful for safe traveling of moving bodies, specifically for safe driving of vehicles.

The invention claimed is:

1. A road surface condition prediction system, comprising:
   a processor; and
   a non-transitory memory storing a program,
   wherein the program, when executed by the processor, causes the processor to function as:
   a collector which collects, through a wired or wireless communication, pieces of moisture information on moisture on a road surface obtained by detecting the moisture on the road surface of a road on which multiple moving bodies are traveling, and pieces of position information each indicating a position on the road surface at which the moisture is detected, one or more of the pieces of moisture information and one or more of the pieces of position information being collected from each of the multiple moving bodies; and
   a predictor which calculates a time needed to disappearance of moisture, unfreezing or freezing based on moisture information obtained by detecting the moisture on a target road surface among pieces of moisture information collected by the collector, and predicts a moisture condition of the target road surface at a target time after a time at which the moisture on the target road surface is detected, based on the time calculated, the target road surface being a road surface at a position indicated by at least one of the pieces of position information collected by the collector,
   the moisture information includes:
      thickness information indicating a thickness of the moisture detected; and
      light absorption information indicating absorption of sunlight by the moisture detected, and
   the predictor estimates a moisture amount based on the thickness information, estimates, based on the light absorption information, likeliness of evaporation of the moisture on the road surface by sunlight, and calculate the time needed to disappearance of moisture, unfreezing or freezing, based on the moisture amount estimated and the likeliness of evaporation estimated.

2. The road surface condition prediction system according to claim 1,
   wherein the moisture information includes temperature information indicating a temperature of the moisture detected.

3. The road surface condition prediction system according to claim 1, wherein the program further causes the processor to function as:
a first obtainer which obtains environmental information indicating at least one of air temperature, humidity, wind speed, light quantity of sunlight, and atmospheric pressure at the position indicated by the at least one of the pieces of position information collected by the collector.

4. The road surface condition prediction system according to claim 3, wherein the program further causes the processor to function as:
a second obtainer which obtains weather information indicating weather at the position indicated by the at least one of the pieces of position information collected by the collector.

5. The road surface condition prediction system according to claim 4, wherein the program further causes the processor to function as:
a discriminator which generates state information indicating a state of the moisture detected by discriminating whether the moisture detected is water, ice, snow, or a mixed state thereof; and
an accumulator which accumulates the state information in association with the at least one of the pieces of position information and the weather information.

6. The road surface condition prediction system according to claim 5,
wherein the discriminator further discriminates a degree of spread of the water, ice, snow, or mixed state thereof on the road surface.

7. The road surface condition prediction system according to claim 5,
wherein the discriminator is mounted on each of the multiple moving bodies.

8. The road surface condition prediction system according to claim 5,
wherein the second obtainer obtains pieces of the weather information multiple times after a time at which moisture on the road surface at the position indicated by the at least one of the pieces of position information is detected, and
the accumulator accumulates the pieces of the weather information obtained by the second obtainer.

9. The road surface condition prediction system according to claim 5,
wherein the accumulator further updates the state information based on the weather information.

10. The road surface condition prediction system according to claim 5,
wherein the accumulator collectively accumulates the state information for each travel route of the multiple moving bodies.

11. The road surface condition prediction system according to claim 5, wherein the program further causes the processor to function as:
a third obtainer which obtains modification information on modification of a road,
wherein the accumulator updates the state information based on the modification information.

12. The road surface condition prediction system according to claim 1, wherein the program further causes the processor to function as:
an announcer which announces a result of prediction by the predictor.

13. The road surface condition prediction system according to claim 12, wherein the program further causes the processor to function as:
a determiner which determines, based on the result of prediction by the predictor, whether the road is passable; and
a searcher which searches for a bypass in the case where the determiner determines that the road is not passable,
wherein the announcer further announces the bypass searched by the searcher.

14. The road surface condition prediction system according claim 1, further comprising:
a distributor which distributes distribution information including the moisture condition predicted by the predictor by using a wired or wireless communication.

15. A driving assistance system, comprising:
the road surface condition prediction system according to claim 14;
a reception terminal which is mounted on a vehicle and receives the distribution information; and
a controller which assists automated driving of the vehicle based on the distribution information received by the reception terminal.

16. A driving assistance system, comprising:
the road surface condition prediction system according to claim 1; and
a controller which assists automated driving of a vehicle based on a result of prediction by the predictor.

17. A road surface condition prediction method, comprising:
collecting, through a wired or wireless communication, pieces of moisture information on moisture on a road surface obtained by detecting the moisture on the road surface of a road where multiple moving bodies are traveling, and pieces of position information each indicating a position on the road surface at which the moisture is detected, one or more of the pieces of moisture information and one or more of the pieces of position information being collected from each of the multiple moving bodies;
calculating, by using a computer, a time needed for disappearance of moisture, unfreezing, or freezing, based on moisture information obtained by detecting the moisture on a target road surface among pieces of moisture information collected, and predicting a moisture condition of the target road surface at a target time after a time at which the moisture on the target road surface is detected, based on the time calculated, the target road surface being a road surface at a position indicated by at least one of the pieces of position information collected; and
distributing information including the moisture condition predicted,
the moisture information includes:
thickness information indicating a thickness of the moisture detected; and
light absorption information indicating absorption of sunlight by the moisture detected, and
the method further comprises
estimating a moisture amount based on the thickness information,
estimating, based on the light absorption information, likeliness of evaporation of the moisture on the road surface by sunlight, and calculating the time needed to disappearance of moisture, unfreezing or freezing, based on the moisture amount estimated and the likeliness of evaporation estimated.

18. A data distribution method, comprising:
distributing distribution information including a result of prediction predicted by the road surface condition prediction method according to claim 17.

* * * * *